(12) United States Patent
Iriyama

(10) Patent No.: US 12,372,763 B2
(45) Date of Patent: Jul. 29, 2025

(54) ZOOM LENS AND IMAGE PICKUP APPARATUS

(71) Applicant: CANON KABUSHIKI KAISHA, Tokyo (JP)

(72) Inventor: Yutaka Iriyama, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 430 days.

(21) Appl. No.: 18/061,289

(22) Filed: Dec. 2, 2022

(65) Prior Publication Data

US 2023/0176348 A1 Jun. 8, 2023

(30) Foreign Application Priority Data

Dec. 7, 2021 (JP) .................................. 2021-198649

(51) Int. Cl.
| | |
|---|---|
| *G02B 15/14* | (2006.01) |
| *G02B 7/10* | (2021.01) |
| *G02B 13/00* | (2006.01) |
| *G02B 27/00* | (2006.01) |

(52) U.S. Cl.
CPC ............ *G02B 15/145* (2019.08); *G02B 7/10* (2013.01); *G02B 13/009* (2013.01); *G02B 13/0095* (2013.01); *G02B 27/0025* (2013.01)

(58) Field of Classification Search
CPC .................. G02B 15/145; G02B 15/10; G02B 15/145125; G02B 15/145129; G02B 15/144113; G02B 15/144; G02B 7/10; G02B 13/009; G02B 13/0095; G02B 27/0025; G02B 27/14

USPC ....... 359/642, 675, 676, 419, 420, 678, 687, 359/765, 721

See application file for complete search history.

(56) References Cited

U.S. PATENT DOCUMENTS

| | | | | |
|---|---|---|---|---|
| 6,185,044 B1 * | 2/2001 | Yoshikawa | ............ | H04N 23/55 359/629 |
| 7,580,199 B2 * | 8/2009 | Yakita | ................... | G02B 27/16 359/716 |
| 7,848,630 B2 * | 12/2010 | Yahagi | ..................... | G02B 7/36 348/375 |

(Continued)

FOREIGN PATENT DOCUMENTS

| | | |
|---|---|---|
| EP | 0 930 779 A2 | 7/1999 |
| EP | 2 020 612 A1 | 2/2009 |

(Continued)

*Primary Examiner* — Wyatt A Stoffa
*Assistant Examiner* — Seth D Moser
(74) *Attorney, Agent, or Firm* — Canon U.S.A., Inc. IP Division

(57) ABSTRACT

A zoom lens includes, in order from an object side, a first lens group of which at least a part moves for focusing, a plurality of lens groups which move in zooming, an aperture stop, and a final lens group which does not move for zooming. The final lens group includes a separation element PR for separating an incident light thereon into a transmitted light and a reflected light, a relay unit LR having a positive refractive power on which the transmitted light is incident, and a relay unit LA having a positive refractive power on which the reflected light is incident. An inequality about Fwp/Fw is satisfied, where Fw is a focal length at a wide angle end of the zoom lens via the relay unit LR and FwP is a focal length at the wide angle end of the zoom lens via the relay unit LA.

15 Claims, 15 Drawing Sheets

(56) References Cited

U.S. PATENT DOCUMENTS

| | | | | |
|---|---|---|---|---|
| 8,801,197 B2* | 8/2014 | Morikuni | ............. | G03B 21/142 |
| | | | | 359/716 |
| 2022/0091411 A1* | 3/2022 | Lotter | ..................... | G02B 23/04 |
| 2023/0244068 A1* | 8/2023 | Xing | ...................... | G02B 13/02 |
| | | | | 359/676 |

FOREIGN PATENT DOCUMENTS

| | | |
|---|---|---|
| EP | 2 386 895 A1 | 11/2011 |
| GB | 2 501 817 A | 11/2013 |
| JP | 5031475 A | 9/2012 |
| JP | 2018 180133 A | 11/2018 |
| WO | 2018/147083 A1 | 8/2018 |

\* cited by examiner

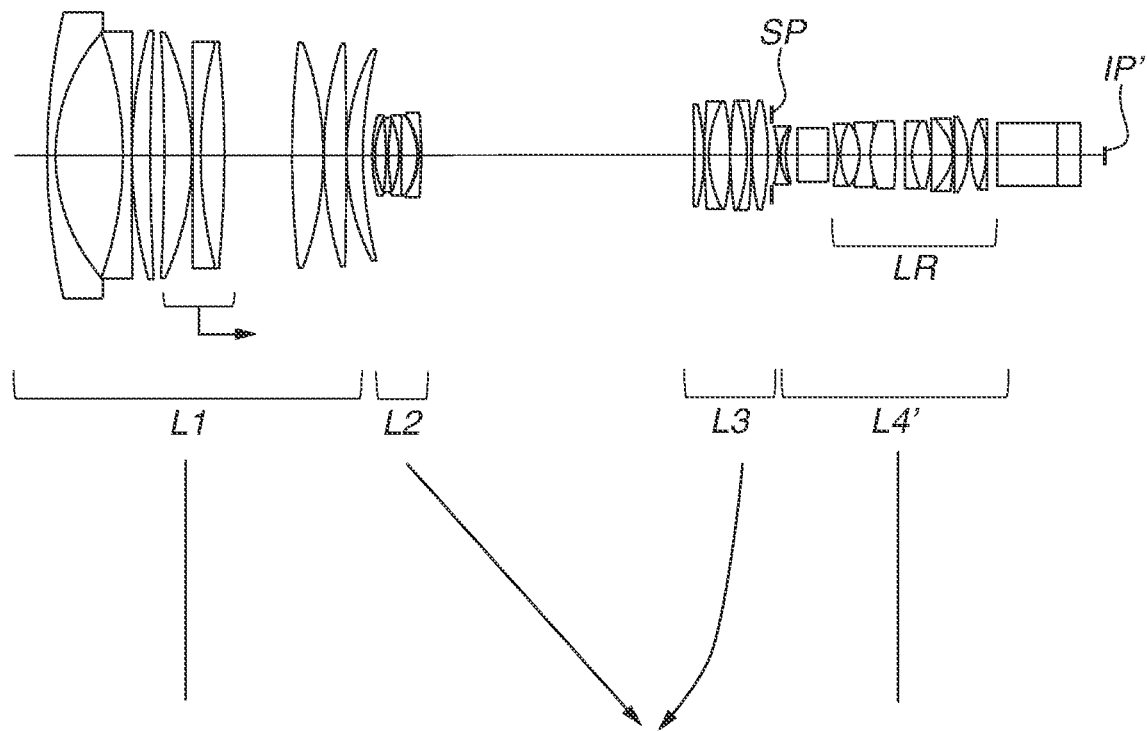
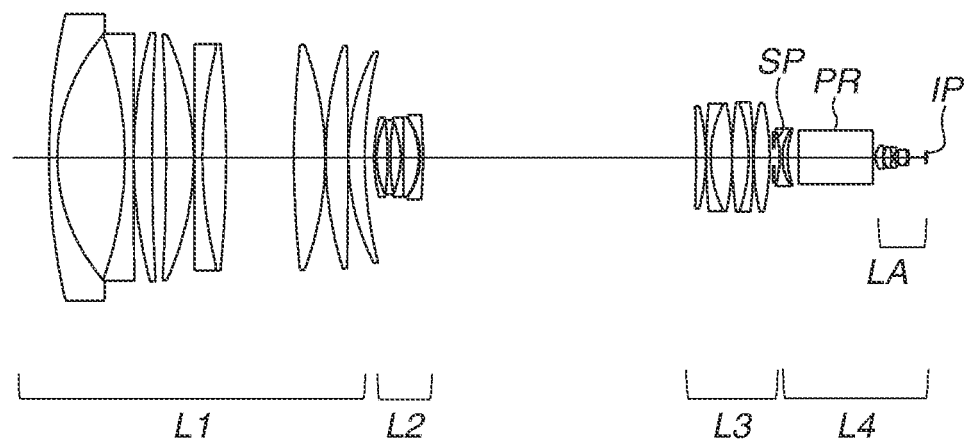

ZOOM LENS AND IMAGE PICKUP APPARATUS

BACKGROUND OF THE INVENTION

Field of the Invention

The present invention relates to a zoom lens and an image pickup apparatus.

Description of the Related Art

There has been known a zoom lens including a separation element for separating light in order to branch a light path. A light flux traveling along the branched light path can be used for an additional functions of the zoom lens such as an auto-focusing function.

Japanese Patent No. 5031475 discusses a zoom lens including a separation element in a relay lens group that is not moved when zooming is executed.

Because of the separation element, there is a possibility that lowering of optical performance and increase in size occur in the above-described zoom lens.

SUMMARY OF THE INVENTION

Aspects of the present invention provides, for example, a zoom lens beneficial in a high optical performance and a small size.

An aspect of embodiments provides a zoom lens including, in order from an object side to an image side, a first lens group in which at least a part moves for focusing, a plurality of lens groups which move in zooming, an aperture stop, and a final lens group which does not move for zooming, wherein the final lens group includes a separation element PR for separating an incident light thereon into a transmitted light and a reflected light, a relay unit LR having a positive refractive power on which the transmitted light is incident, and a relay unit LA having a positive refractive power on which the reflected light is incident, and wherein an inequality $$0.50 < Fwp/Fw < 0.80$$

is satisfied, where Fw is a focal length at a wide angle end of the zoom lens via the relay unit LR and FwP is a focal length at the wide angle end of the zoom lens via the relay unit LA.

Further features of the present invention will become apparent from the following description of embodiments with reference to the attached drawings.

BRIEF DESCRIPTION OF THE DRAWINGS

FIGS. 4A and 4B are diagrams illustrating cross-sectional views at a wide angle end of a zoom lens according to an embodiment 2.

DESCRIPTION OF THE EMBODIMENTS

Figure 1A:
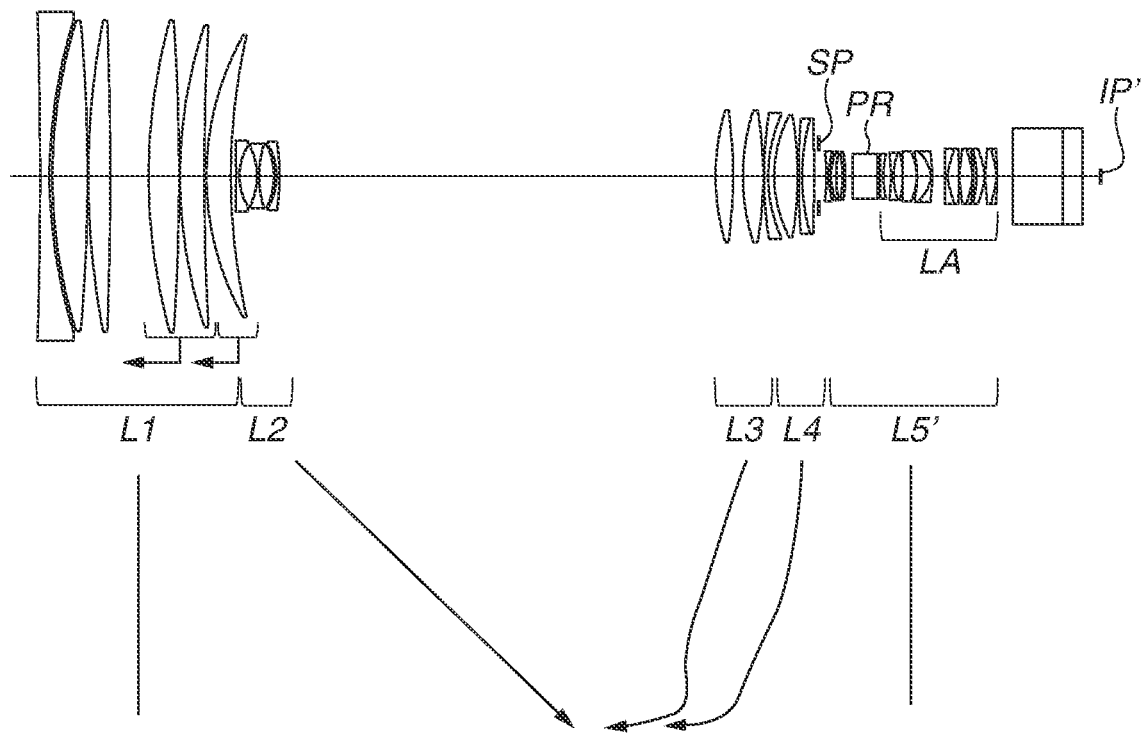
FIGS. 1A and 1B are diagrams illustrating cross-sectional views at a wide angle end of a zoom lens according to an embodiment 1.

Hereinafter, embodiments according to the present invention will be described with reference to the appended drawings. In principle, unless otherwise noted, common reference numerals are applied to members common in all of the appended drawings illustrating the embodiments, and repetitive descriptions thereof will be omitted.

Embodiment According to Zoom Lens

Figure 14A:
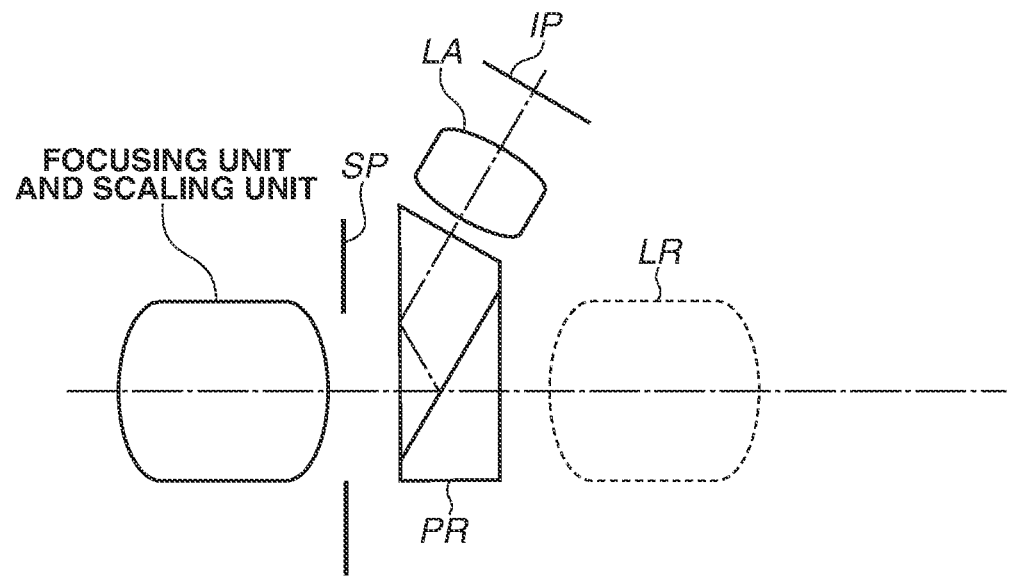
FIGS. 14A and 14B are diagrams illustrating examples of a configuration of a zoom lens apparatus.
Figure 14B:
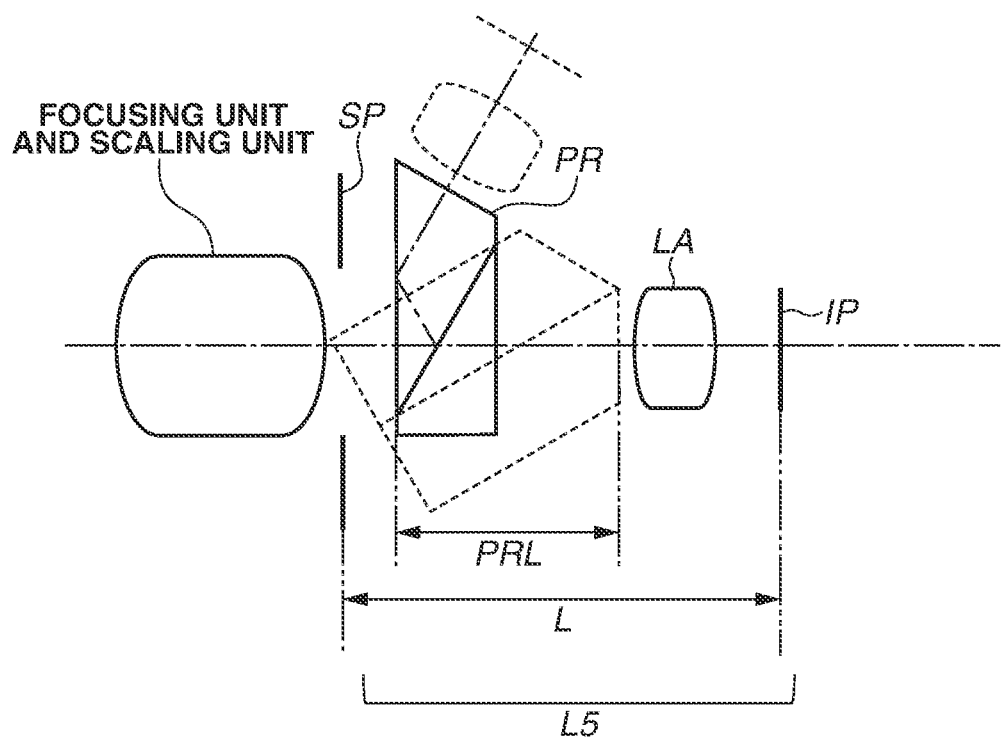

FIGS. 14A and 14B are diagrams illustrating examples of a configuration of a zoom lens apparatus. In FIG. 14A, through a separation element PR which separates incident light (light flux) into transmitted light and reflected light, a light path is branched into a path (i.e., straight light path or transmitted light path) of light traveling straight after passing through the separation element PR and a path (i.e., reflected light path) of light traveling after being reflected by the separation element PR. In FIG. 14B, the reflected light path is schematically developed on a straight line. Each of the embodiments according to the present embodiment describes a numerical embodiment of an optical system including the reflected light path. As illustrated in FIG. 14B, a focusing unit (i.e., a first lens group) and a scaling unit (i.e., a plurality of lens groups moved when zooming is executed), and an aperture stop SP are sequentially arranged from an object side to an image side. The separation element PR is arranged next to the aperture stop SP on the image side. In the reflected light path, light passes through the separation element PR along a light path having a long light path length PRL, and forms an image on an image plane IP via a relay unit LA (also called "lens group LA"). There is a possibility that a size of the relay unit LA is increased due to the long light path length PRL.

The present embodiment takes into consideration an issue of a large-sized relay unit. Herein, Fw represents a focal length at a wide angle end of an optical system (zoom lens) including the transmitted light path on which the relay unit LR is arranged, and FwP represents a focal length at the wide angle end of the optical system including the reflected light path on which the relay unit LA is arranged. For the sake of downsizing (i.e., reduction in diameter) of the relay unit LA and improvement in the optical performance of the zoom lens, it is preferable that the following condition (a conditional expression, i.e., an inequality) be satisfied.

$$0.50 < FwP/Fw < 0.80 \quad (1)$$

In the above-described conditional expression (1), a configuration advantageous to the small-sized relay unit LA can be acquired in a case where a condition with respect to an upper limit value is satisfied, so that it is possible to provide a zoom lens advantageous in terms of downsizing. Further, when a condition with respect to a lower limit value of the conditional expression (1) is not satisfied, refractive power of the relay unit LA is increased excessively, so that optical performance thereof is lowered. It is more preferable that the following conditional expression be satisfied.

$$0.50 < FwP/Fw < 0.75 \quad (1a)$$

Further, it is more preferable that the following condition be satisfied.

$$0.60 < FwP/Fw < 0.75 \quad (1b)$$

Still further, it is even more preferable that the following condition be satisfied.

$$0.60 < FwP/Fw < 0.70 \quad (1c)$$

Herein, it is preferable that the relay unit LA include a lens LAG1 having positive refractive power and a cemented lens LAG3A consisting of a positive lens and a negative lens cemented together, which are sequentially arranged from the object side close to the separation element PR to the image side. A height of an off-axis light flux incident on the relay unit LA becomes high due to the long light path length PRL of a light path within the separation element PR which the off-axis light flux passes through. In this case, by arranging the positive lens LAG1, a size of a lens group arranged posterior to the positive lens LAG1 can be reduced. Further, chromatic aberration occurring in the above-described configuration can be reduced by arranging the cemented lens LAG3A.

Further, it is preferable that a lens group having positive refractive power be arranged next to the aperture stop SP on the object side and moved to the object side when zooming is executed from the wide angle end to the telephoto end. The above-described configuration is advantageous to a zoom lens having a high zoom ratio.

Furthermore, it is preferable that the following conditional expression be satisfied where an Abbe number of the positive lens included in the cemented lens LAG3A is vLAG2, and an Abbe number of the positive lens included in the cemented lens LAG3A is vLAG3.

$$30 < vLAG2 - vLAG3 < 80 \quad (2)$$

If a condition with respect to a lower limit value of the conditional expression (2) is not satisfied, chromatic aberration occurring in the lens LAG1 is not corrected sufficiently. If a condition with respect to an upper limit value of the conditional expression (2) is not satisfied, chromatic aberration occurring in the lens LAG1 is corrected excessively.

It is more preferable that the following condition be satisfied.

$$33 < vLAG2 - vLAG3 < 80 \quad (2a)$$

Furthermore, it is more preferable that the following condition be satisfied.

$$35 < vLAG2 - vLAG3 < 75 \quad (2b)$$

Further, it is preferable that the separation element PR (also referred to as a splitting element) include an incident surface and a separation surface for separating (splitting) light incident on the incident surface into the above-described reflected light and the transmitted light, and reflect (totally reflect) the reflected light from the separation surface with the incident surface to cause the reflected light to be output from the separation element PR. With this configuration, a total length of the optical system including the relay unit LR is shortened, so that it is possible to provide a zoom lens advantageous in terms of downsizing. Further, it is preferable that the following conditional expression be satisfied where L is a distance from the aperture stop SP to the image plane IP (an image plane of the zoom lens caused by the relay unit LA), and PRL is a light path length of the separation element PR on the reflected light path (a light path of the zoom lens via the relay unit LA).

$$0.35 < PRL/L < 0.60 \quad (3)$$

If a condition with respect to a lower limit value of the conditional expression (3) is not satisfied, a light path length of the transmitted light path in the separation element PR is lengthened, so that a total length of the zoom lens is increased excessively. If a condition with respect to an upper limit value of the conditional expression (3) is not satisfied, a light path length of the reflected light path in the separation element PR is lengthened, so that a diameter of the relay unit LA is increased excessively. It is more preferable that the following condition be satisfied.

$$0.38 < PRL/L < 0.55 \quad (3a)$$

Furthermore, it is more preferable that the following condition be satisfied.

$$0.41 < PRL/L < 0.52 \quad (3a)$$

Further, in the zoom lens according to the present embodiment, it is preferable that the relay unit LA include a lens LAG1 having positive refractive power arranged closest to the object side and a lens LAGN. Then, it is preferable that the following conditional expression be satisfied where fLA is a focal length of the relay unit LA and $\varphi LAG1R1$ is refractive power of a surface LAG1R1 of the lens LAG1 on the object side.

$$0.20 < (fLA \times \varphi LAG1R1)^{-1} < 1.00 \quad (4)$$

If a condition with respect to a lower limit value of the conditional expression (4) is not satisfied, aberrations (e.g., spherical aberration and on-axis chromatic aberration) occurring on the surface G1R1 become excessively large, so that it will be difficult to acquire a zoom lens having high optical performance. If a condition with respect to an upper limit value of the conditional expression (4) is not satisfied, effective diameters of surfaces which follow the surface G1R1 become excessively large, so that it will be difficult to acquire a small-sized zoom lens. It is more preferable that the following condition be satisfied.

$$0.35 < (fLA \times \varphi LAG1R1)^{-1} < 0.80 \quad (4a)$$

Further, it is more preferable that the following condition be satisfied.

$$0.50 < (fLA \times \varphi LAG1R1)^{-1} < 0.60 \quad (4b)$$

Embodiment According to Image Capturing Apparatus

Figure 15:
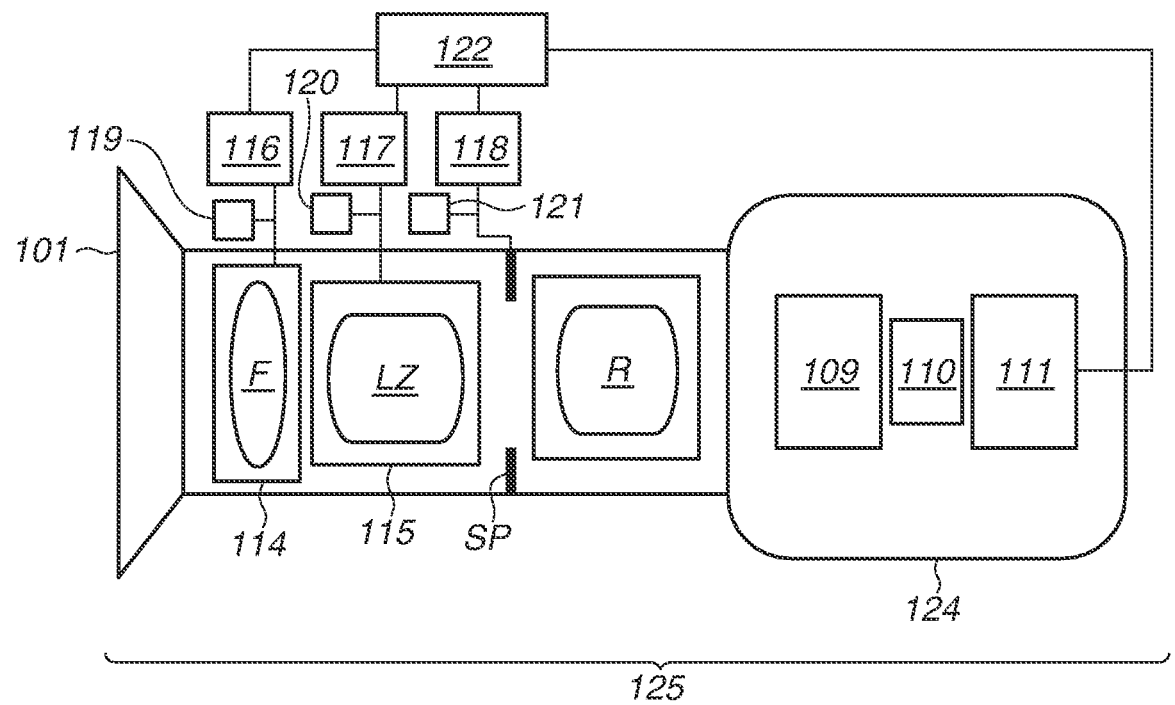
FIG. 15 is a diagram illustrating an example of a configuration of an image pickup apparatus.

FIG. 15 is a diagram illustrating an example of a configuration of an image pickup apparatus 125. In FIG. 15, a zoom lens 101 is any one of the zoom lenses according to the embodiments 1 to 5. An image pickup apparatus 125 includes a camera main body 124. The zoom lens 101 is attachable to and detachable from the camera main body 124. The image pickup apparatus 125 includes the camera main body 124 and the zoom lens 101 mounted on the camera main body 124. The zoom lens 101 includes a first lens group F, two or more lens groups LZ which are moved when zooming (scaling) is executed, and a final lens group R. At least part of the first lens group F is moved on an optical axis in order to execute focusing (bring an object into focus). In the present embodiment, the first lens group F includes a second sub-lens group which is moved on the optical axis in order to execute focusing and a first sub-lens group and a third sub-lens group which are not moved when focusing is executed, although a configuration thereof is not limited thereto.

The two or more lens groups LZ for executing zooming are moved on the optical axis when zooming is executed. The zoom lens 101 also includes an aperture stop SP. The final lens group R may include a sub-lens group which can be inserted and removed to/from the light path. A range of the focal length of the zoom lens 101 can be changed by insertion and/or removal of the sub-lens group. The second sub-lens group 1b and the two or more lens groups LZ for executing zooming are respectively driven in the optical axis direction by driving mechanisms 114 and 115. Each of the driving mechanisms 114 and 115 may include elements such as a helicoid and a cam. Motors (driving units) 116 to 118 respectively drive the driving mechanisms 114 and 115 and the aperture stop SP. Detection units 119 to 121 respectively detect a position of the second sub-lens group 1b on the optical axis, positions of the two or more lens groups LZ for executing zooming on the optical axis, and an opening size of the aperture stop SP. Each of the detection units 119 to 121 is configured of constituent elements such as an encoder, a potentiometer, and a photosensor. The camera main body 124 includes a glass block 109 which includes an optical filter and an image pickup element (photoelectric conversion element) 110 for picking up an object image formed by the zoom lens 101. The image sensor 110 is configured of a charge-coupled device (CCD) sensor or a complementary metal-oxide semiconductor (CMOS) sensor. A central processing unit (CPU) 111 operates as a processing unit (control unit) of the camera main body 124, and a CPU 122 operates as a processing unit (control unit) of the zoom lens 101. As described above, by mounting the zoom lens according to the above-described embodiment on the camera main body, it is possible to provide a functional image pickup apparatus including the zoom lens having the above-described advantageous effect.

Figure 1B:
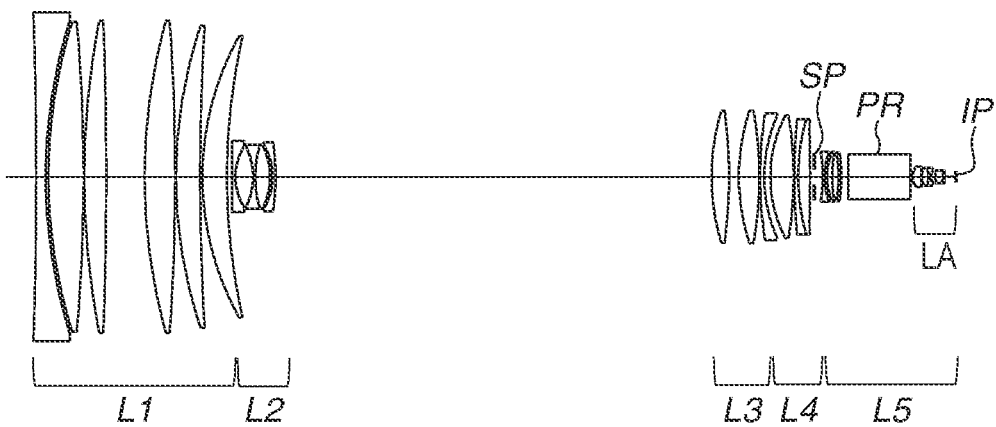
Figure 2A:
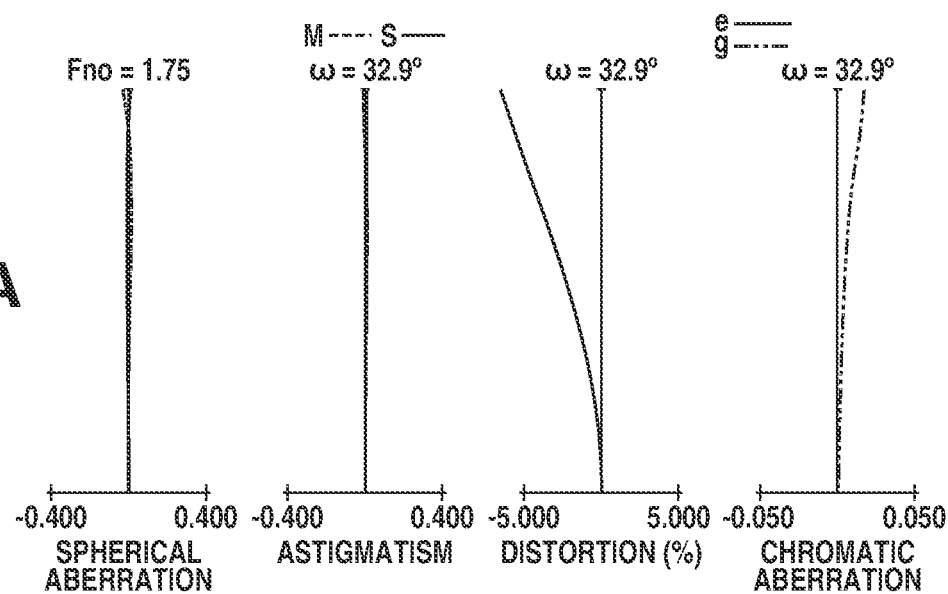
FIGS. 2A, 2B, and 2C are aberration charts illustrating aberrations in a transmitted light path according to the embodiment 1 and an embodiment 4.
Figure 2B:
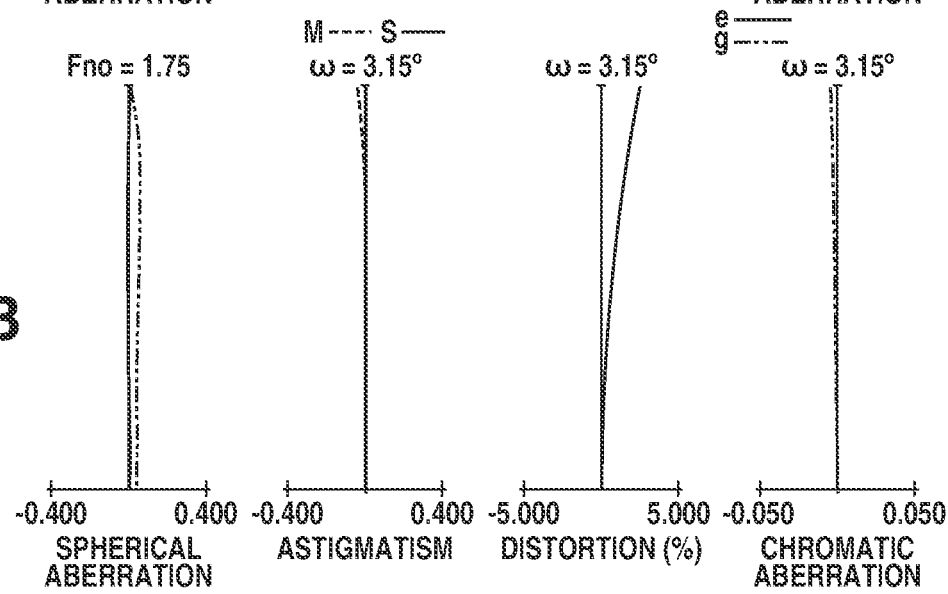
Figure 2C:
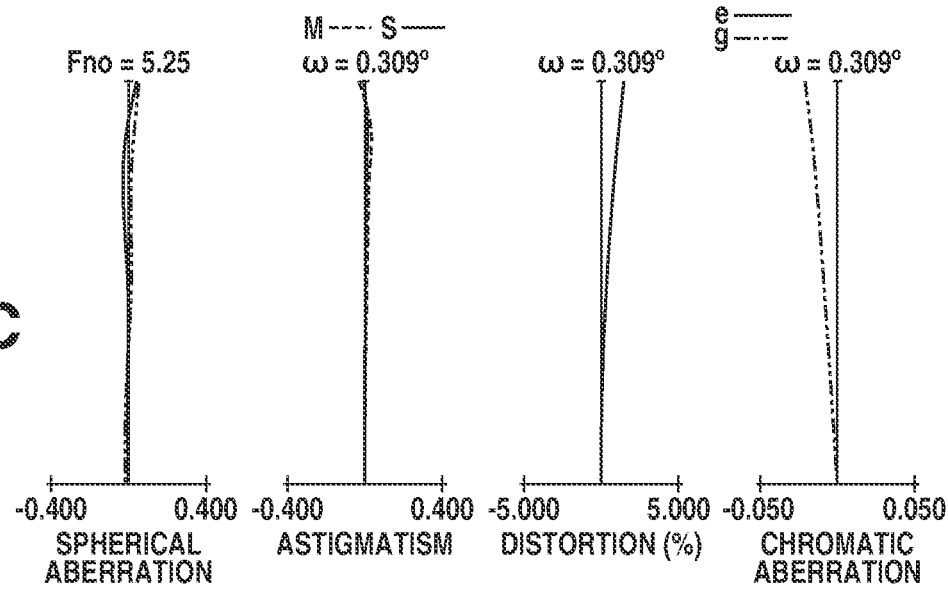
Figure 3A:
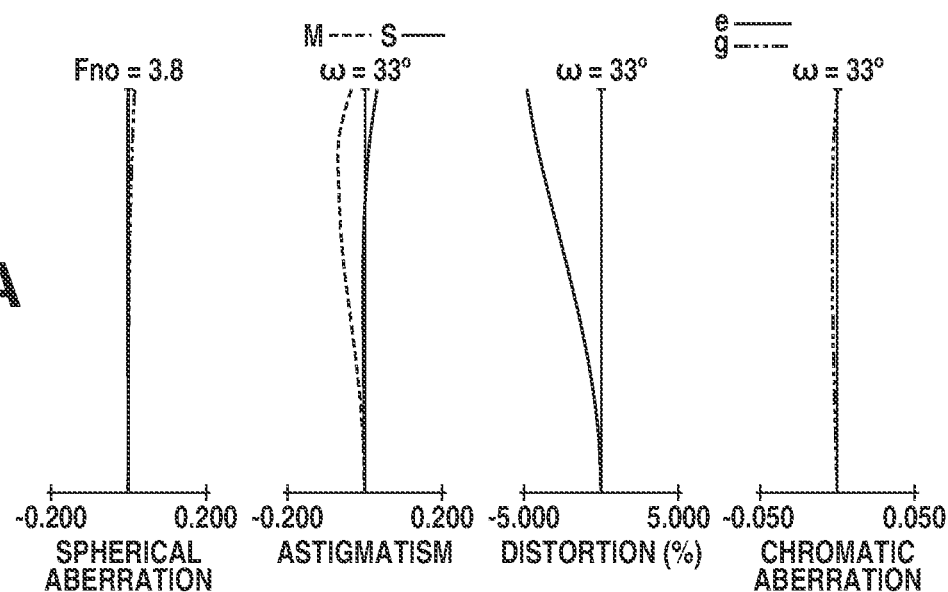
FIGS. 3A, 3B, and 3C are aberration charts illustrating aberrations in a reflected light path according to the embodiment 1.
Figure 3B:
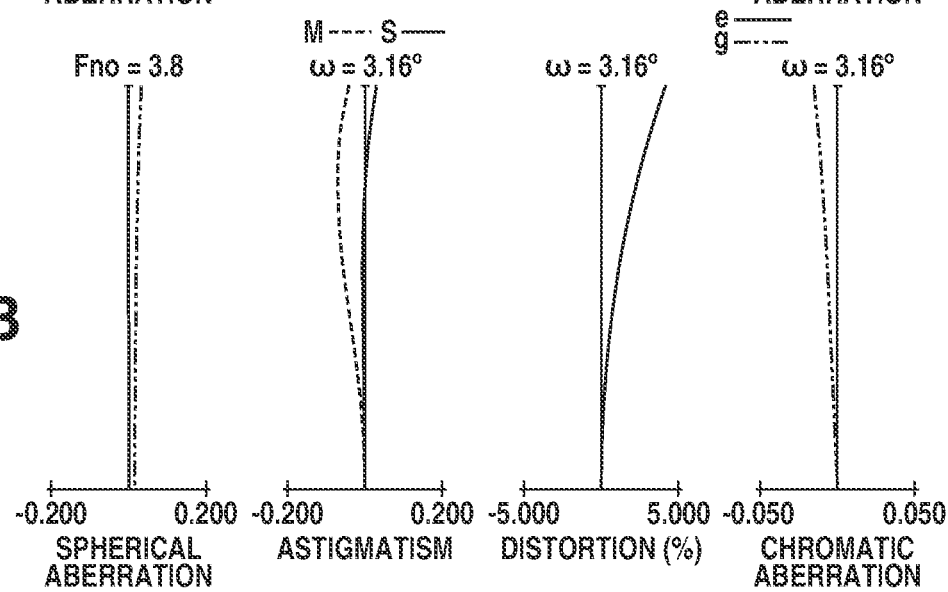
Figure 3C:
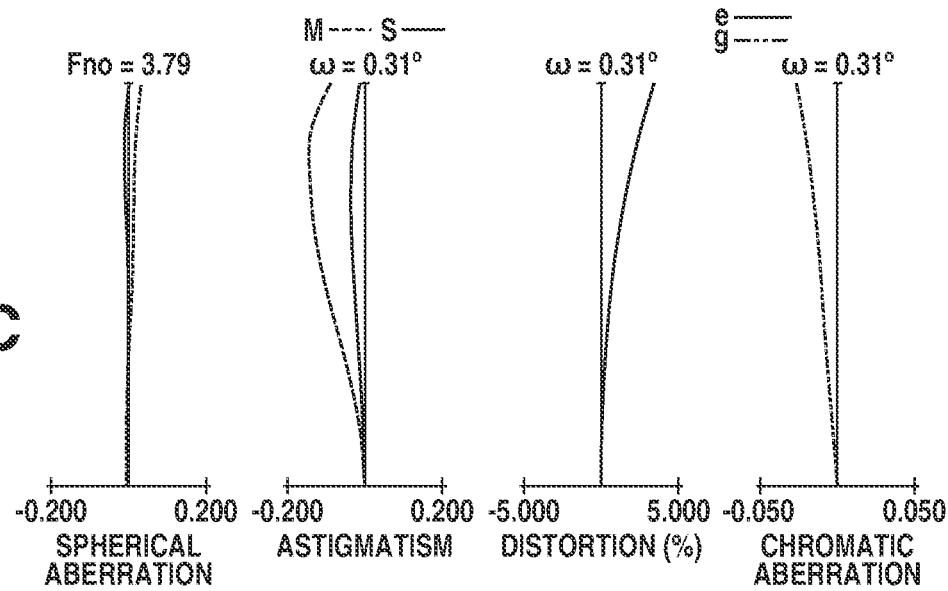

A zoom lens according to a (numerical) embodiment 1 will be described with reference to FIGS. 1A and 1B, FIGS. 2A to 2C, and FIGS. 3A to 3C. FIGS. 1A and 1B are diagrams illustrating cross-sectional views at the wide angle end of the zoom lens according to the embodiment 1. FIGS. 2A, 2B, and 2C are aberration charts respectively illustrating aberrations in a transmitted light path at the wide angle end, the intermediate area, and the telephoto end. FIGS. 3A, 3B, and 3C are aberration charts respectively illustrating aberrations in a reflected light path at the wide angle end, the intermediate area, and the telephoto end. FIG. 1A illustrates a cross-sectional view of the zoom lens including the transmitted light path. FIG. 1A also illustrates loci of the plurality of lens groups moved when zooming is executed, and loci (moving directions) of sub-lens groups (a sub-lens group including 7th to 10th surfaces and a sub-lens group including 11th and 12th surfaces) moved when focusing is executed. FIG. 1B schematically illustrates a cross-sectional view of the zoom lens including the reflected light path. The zoom lens according to the embodiment 1 consists of a first lens group L1 having positive refractive power, a second lens group L2 having negative refractive power, a third lens group L3 having positive refractive power, a fourth lens group L4 having positive refractive power, an aperture stop SP, and fifth (final) lens groups L5' and L5 having positive refractive power, which are sequentially arranged from the object side to the image side. An image pickup surface of an image pickup element such as an image sensor is arranged on an image plane IP'. A light receiving unit for adding an auto-focusing (AF) function to the zoom lens (i.e., a sensor used for AF) is arranged on an image plane IP. Further, instead of or in addition to the above-described light receiving unit, another light receiving unit for adding a function other than the AF function (e.g., a light-metering (photometry) function or a function of picking up an image in a plurality of wavelength regions) to the zoom lens can be arranged on the image plane IP.

When zooming is executed from the wide angle end to the telephoto end, the first lens group L1 and the final lens groups L5' and L5 are not moved, the second lens group L2 is moved to the image side, and the third lens group L3 and the fourth lens group L4 are moved. The final lens group L5' includes a prism PR as a separation element which separates light into transmitted light and reflected light in order to branch a light path and a relay unit LR having positive refractive power which functions to form an image, which are sequentially arranged from the object side to the image side. The final lens group L5 includes a prism PR and a relay unit LA having positive refractive power which functions to form an image, which are sequentially arranged from the object side to the image side.

Next, FIGS. 2A to 2C and FIGS. 3A to 3C will be described. In each of spherical aberration charts, a solid line represents spherical aberration in an e-line (wavelength: 594.6 nm), and a dashed two-dotted line represents spherical aberration in a g-line (wavelength: 435.8 nm). In each of astigmatism charts, a solid line S represents astigmatism in a sagittal section, and a dashed line M represents astigmatism in a meridional section. Each of distortion charts illustrates distortion in the e-line. Each of chromatic aberration charts illustrates magnification chromatic aberration in the g-line. Further, in FIGS. 2A to 2C and FIGS. 3A to 3C, Fno denotes an F-number, and w denotes a half-angle of view (°). The above descriptions of the aberration charts are also applicable to the other embodiments.

Figure 5A:
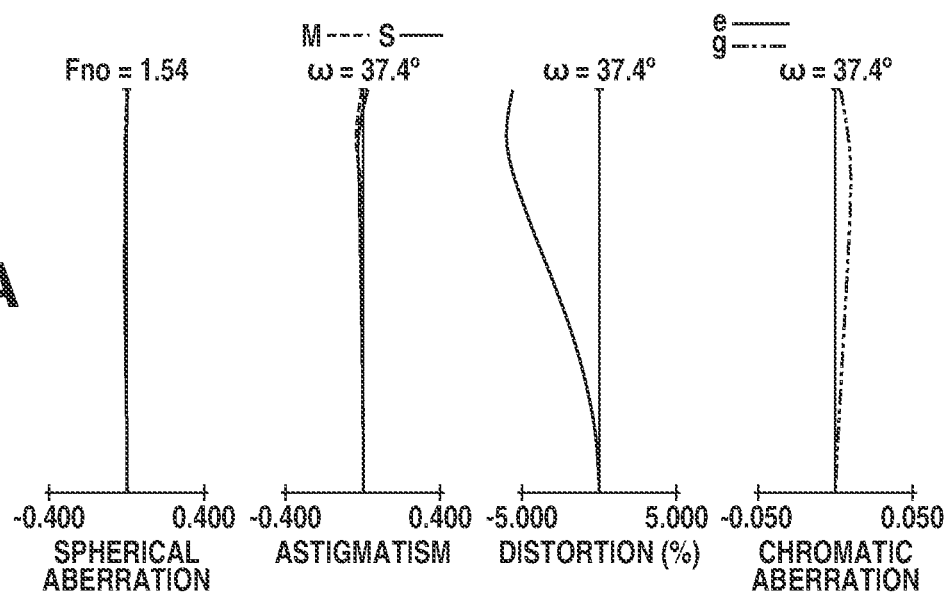
FIGS. 5A, 5B, and 5C are aberration charts illustrating aberrations in a transmitted light path according to the embodiment 2 and an embodiment 5.
Figure 5B:
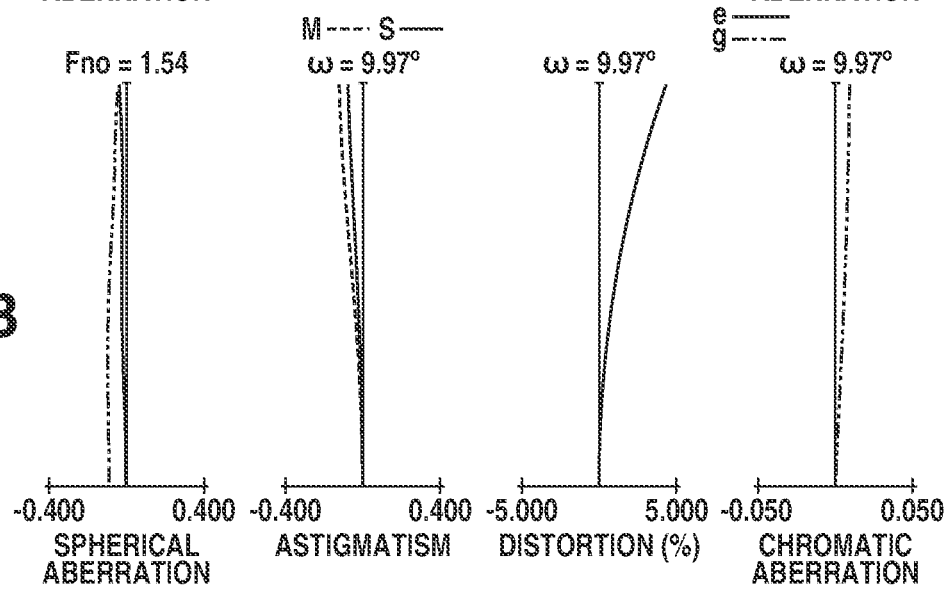
Figure 5C:
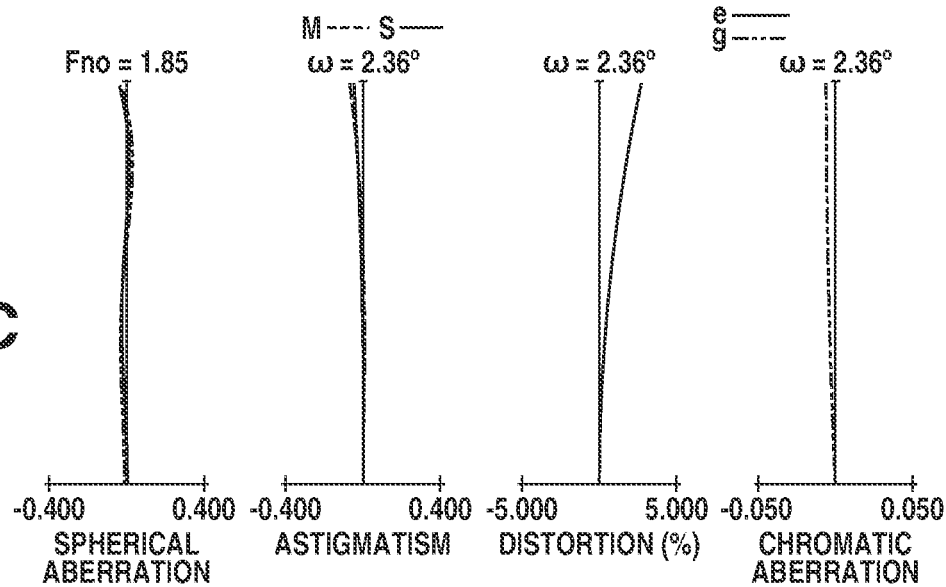
Figure 6A:
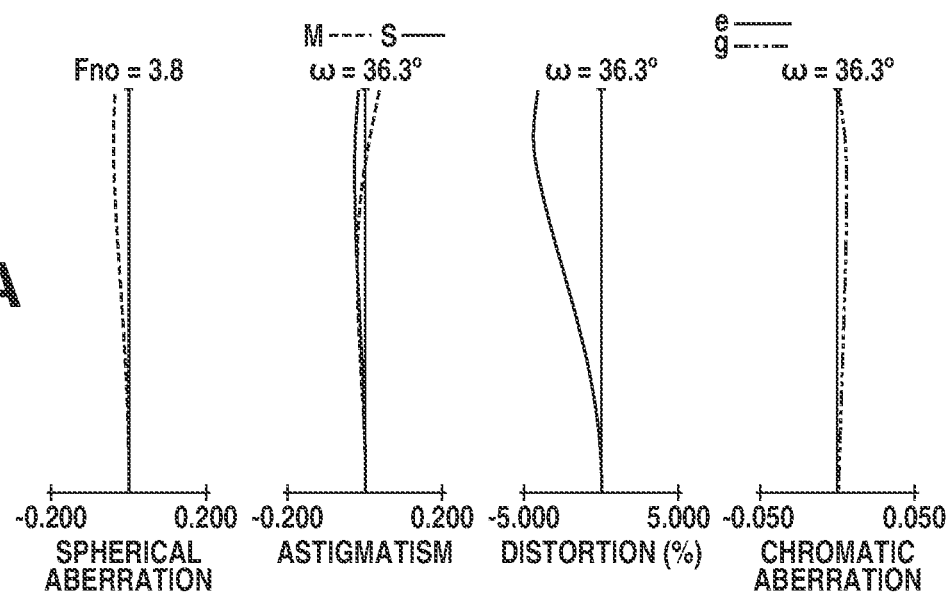
FIGS. 6A, 6B, and 6C are aberration charts illustrating aberrations in a reflected light path according to the embodiment 2.
Figure 6B:
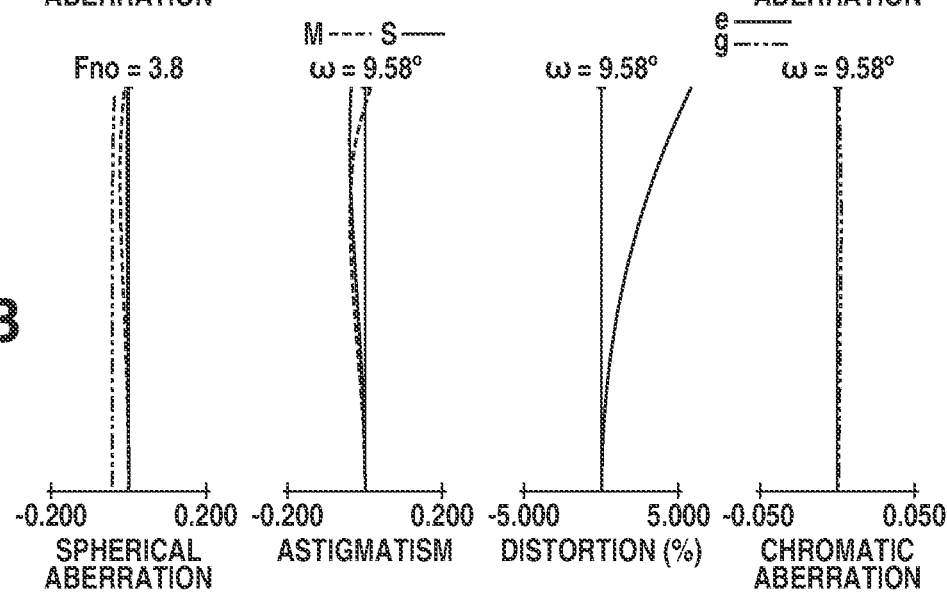
Figure 6C:
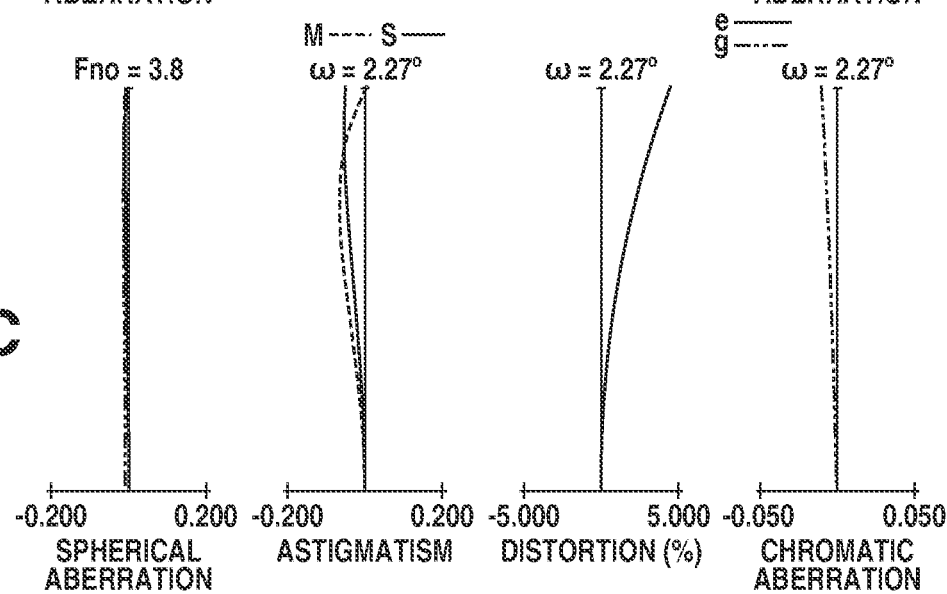

A zoom lens according to a (numerical) embodiment 2 will be described with reference to FIGS. 4A and 4B, FIGS. 5A to 5C, and FIGS. 6A to 6C. FIGS. 4A and 4B are diagrams illustrating cross-sectional views at the wide angle end of the zoom lens according to the embodiment 2. FIGS. 5A, 5B, and 5C are aberration charts respectively illustrating aberrations in a transmitted light path at the wide angle end, the intermediate area, and the telephoto end. FIGS. 6A, 6B, and 6C are aberration charts respectively illustrating aberrations in a reflected light path at the wide angle end, the intermediate area, and the telephoto end. FIG. 4A illustrates a cross-sectional view of the zoom lens including the transmitted light path. FIG. 4A also illustrates loci of the plurality of lens groups moved when zooming is executed, and a locus (moving direction) of a sub-lens group (a sub-lens group including 7th to 11th surfaces) moved when focusing is executed. FIG. 4B schematically illustrates a cross-sectional view of the zoom lens including the reflected light path. The zoom lens according to the embodiment 2 consists of a first lens group L1 having positive refractive power, a second lens group L2 having negative refractive power, a third lens group L3 having positive refractive power, an aperture stop SP, and fourth (final) lens groups L4' and L4 having positive refractive power, which are sequentially arranged from the object side to the image side. An image pickup surface of an image pickup element such as an image sensor is arranged on an image plane IP'. A light receiving unit (i.e., a sensor) for adding the AF function to the zoom lens is arranged on an image plane IP. Further, instead of or in addition to the light receiving unit, another light receiving unit for adding the above-described function other than the AF function to the zoom lens can be arranged on the image plane IP.

When zooming is executed from the wide angle end to the telephoto end, the first lens group L1 and the final lens groups L4' and L4 are not moved, the second lens group L2 is moved to the image side, and the third lens group L3 is moved.

The final lens group L4' includes a prism PR as a separation element which separates light into transmitted light and reflected light in order to branch a light path and a relay unit LR having positive refractive power which functions to form an image, which are sequentially arranged from the object side to the image side. The final lens group L4 includes a prism PR and a relay unit LA having positive refractive power which functions to form an image, which are sequentially arranged from the object side to the image side.

Figure 7A:
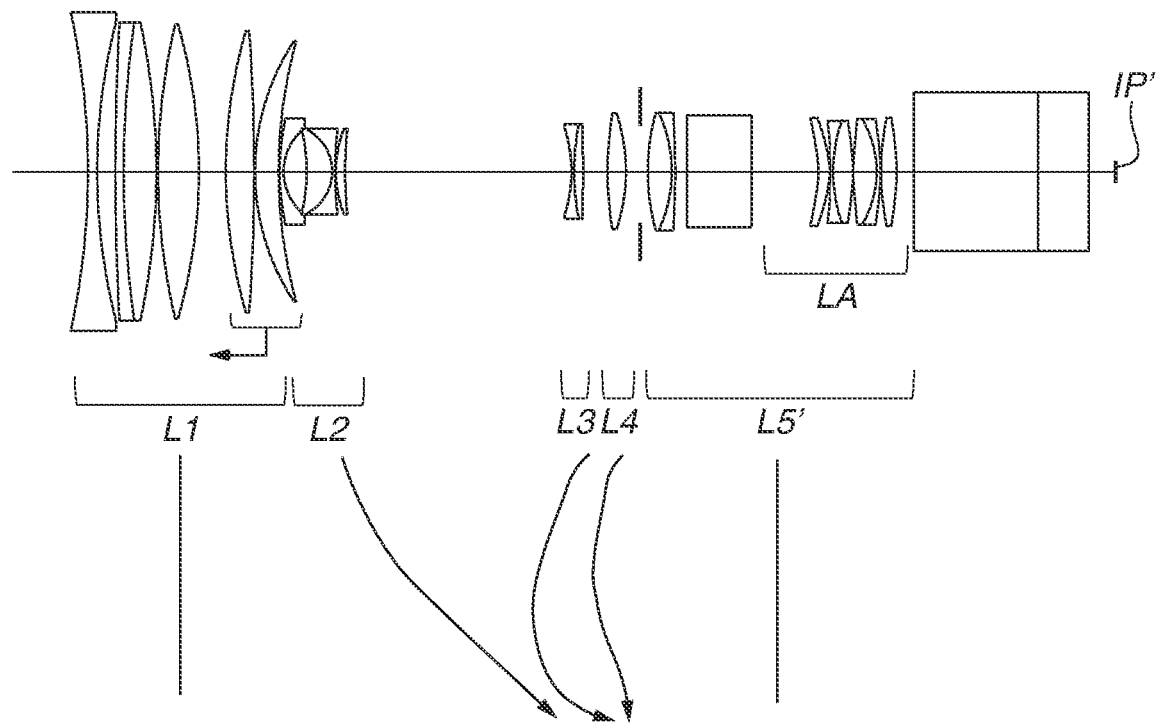
FIGS. 7A and 7B are diagrams illustrating cross-sectional views at a wide angle end of a zoom lens according to an embodiment 3.
Figure 7B:
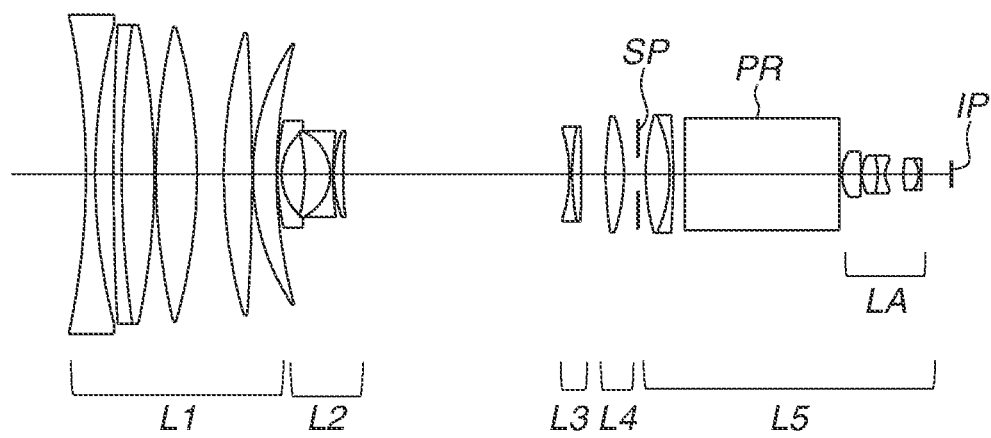
Figure 8A:
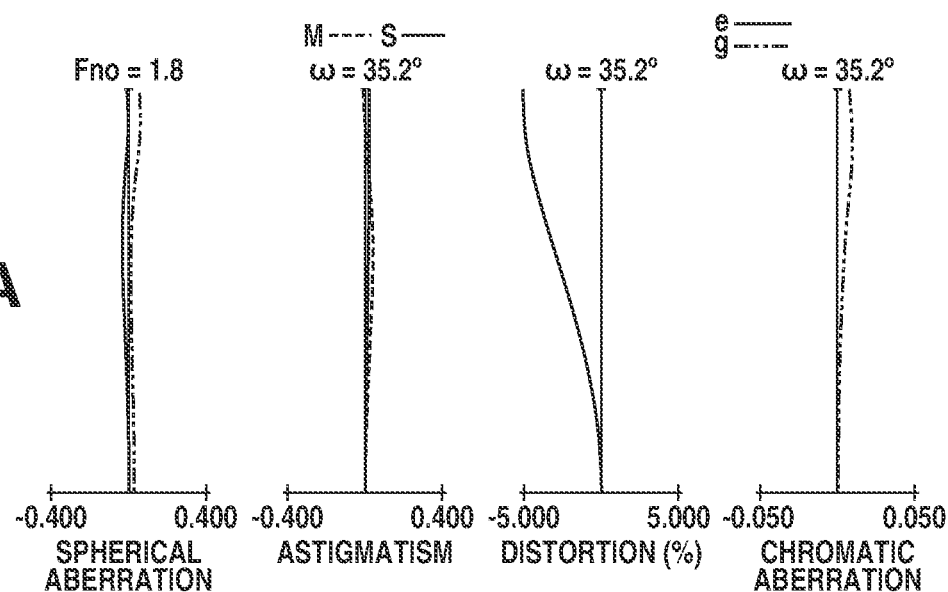
FIGS. 8A, 8B, and 8C are aberration charts illustrating aberrations in a transmitted light path according to the embodiment 3.
Figure 8B:
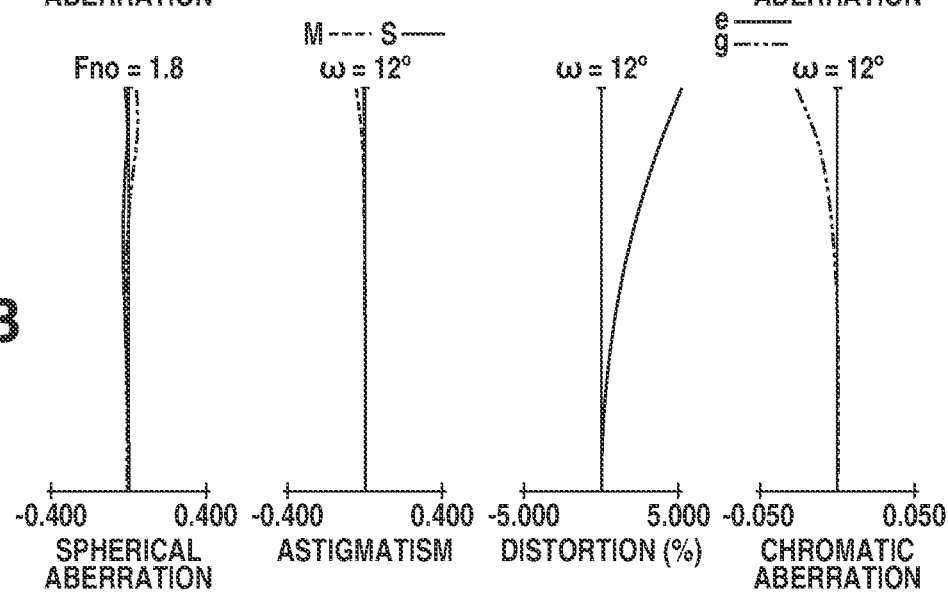
Figure 8C:
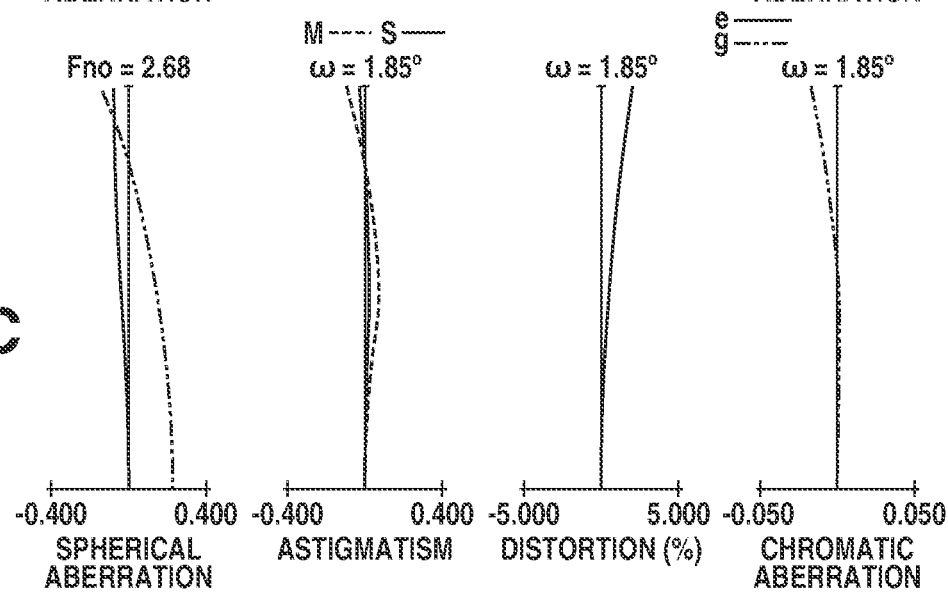
Figure 9A:
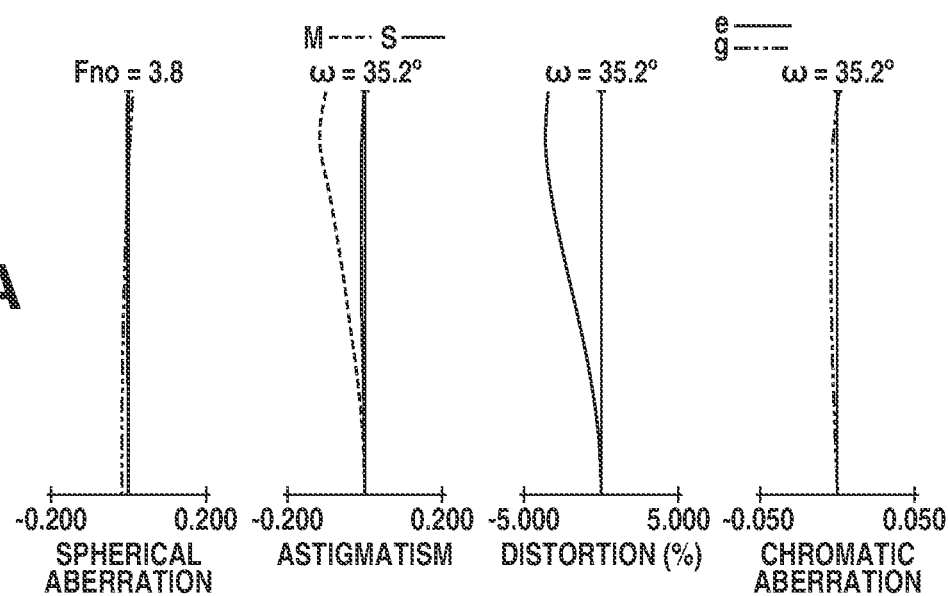
FIGS. 9A, 9B, and 9C are aberration charts illustrating aberrations in a reflected light path according to the embodiment 3.
Figure 9B:
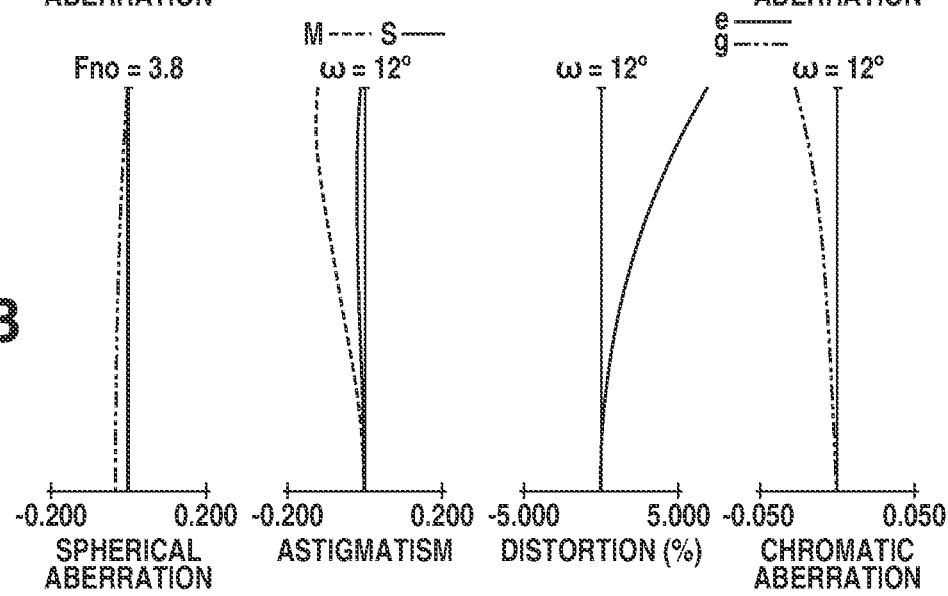
Figure 9C:
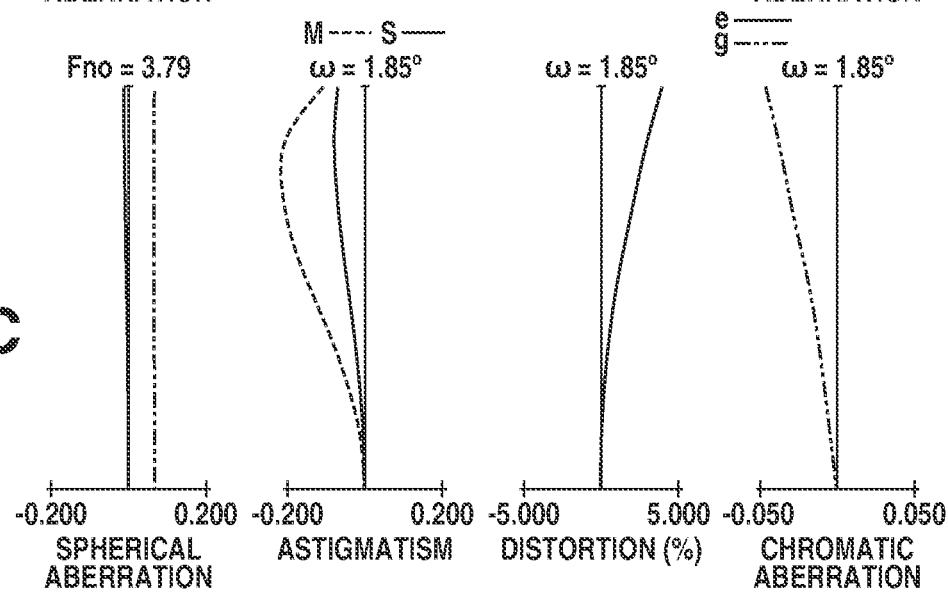

A zoom lens according to a (numerical) embodiment 3 will be described with reference to FIGS. 7A and 7B, FIGS. 8A to 8C, and FIGS. 9A to 9C. FIGS. 7A and 7B are diagrams illustrating cross-sectional views at the wide angle end of the zoom lens according to the embodiment 3. FIGS. 8A, 8B, and 8C are aberration charts respectively illustrating aberrations in a transmitted light path at the wide angle end, the intermediate area, and the telephoto end. FIGS. 9A, 9B, and 9C are aberration charts respectively illustrating aberrations in a reflected light path at the wide angle end, the intermediate area, and the telephoto end. FIG. 7A illustrates a cross-sectional view of the zoom lens including the transmitted light path. FIG. 7A also illustrates loci of the plurality of lens groups moved when zooming is executed, and a locus (moving direction) of a sub-lens group (a sub-lens group including 8th to 11th surfaces) moved when focusing is executed. FIG. 7B schematically illustrates a cross-sectional view of the zoom lens including the reflected light path. The zoom lens according to the embodiment 3 includes a first lens group L1 having positive refractive power, a second lens group L2 having negative refractive power, a third lens group L3 having negative refractive power, a fourth lens group L4 having positive refractive power, an aperture stop SP, and fifth (final) lens groups L5' and L5 having positive refractive power, which are sequentially arranged from the object side to the image side. An image pickup surface of an image pickup element such as an image sensor is arranged on an image plane IP'. A light receiving unit (i.e., a sensor) for adding the AF function to the zoom lens is arranged on an image plane IP. Further, instead of or in addition to the light receiving unit, another light receiving unit for adding the above-described function other than the AF function to the zoom lens can be arranged on the image plane IP.

When zooming is executed from the wide angle end to the telephoto end, the first lens group L1 and the final lens groups L5' and L5 are not moved, the second lens group L2 is moved to the image side, and the third lens group L3 and the fourth lens group L4 are moved. The final lens group L5' includes a prism PR as a separation element which separates light into transmitted light and reflected light in order to branch a light path and a relay unit LR having positive refractive power which functions to form an image, which are sequentially arranged from the object side to the image side. The final lens group L5 includes a prism PR and a relay unit LA having positive refractive power which functions to form an image, which are sequentially arranged from the object side to the image side.

Figure 10A:
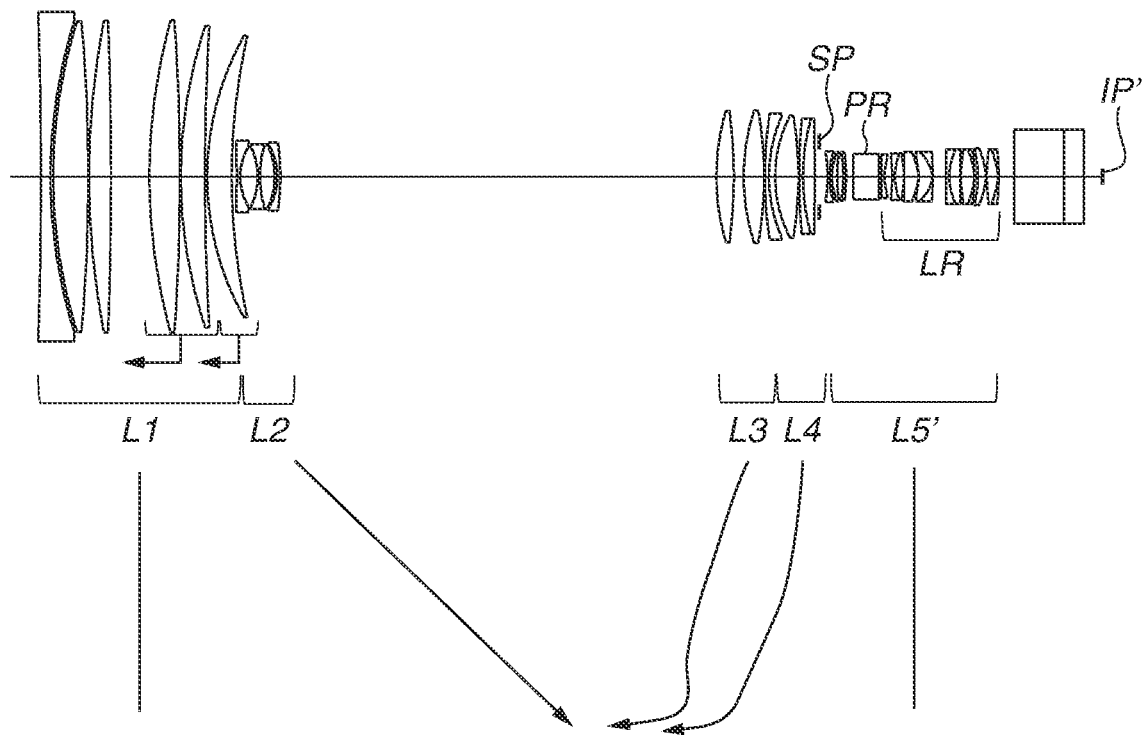
FIGS. 10A and 10B are diagrams illustrating cross-sectional views at a wide angle end of a zoom lens according to the embodiment 4.
Figure 10B:
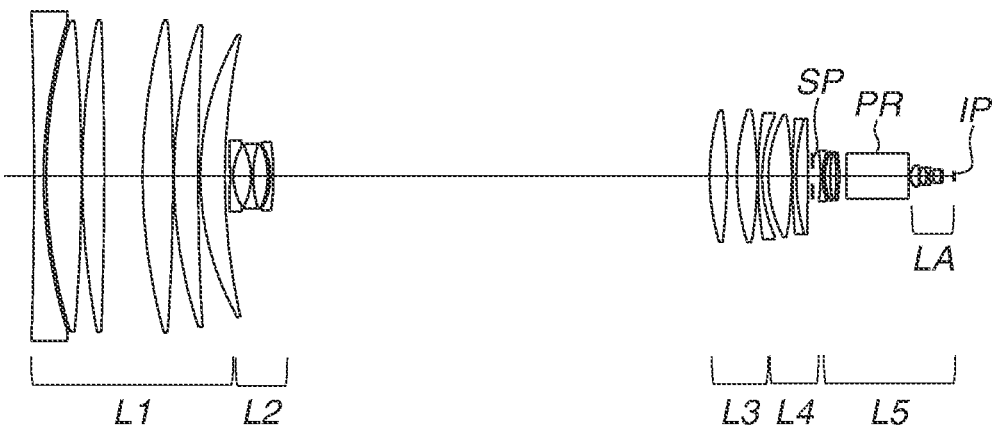
Figure 11A:
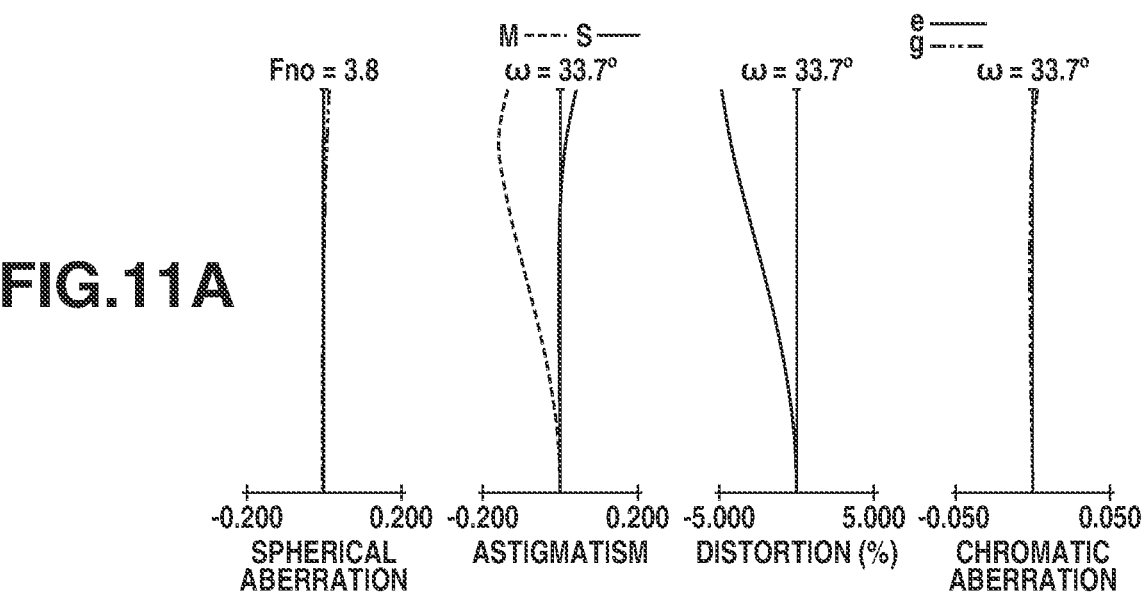
FIGS. 11A, 11B, and 11C are aberration charts illustrating aberrations in a reflected light path according to the embodiment 4.
Figure 11B:
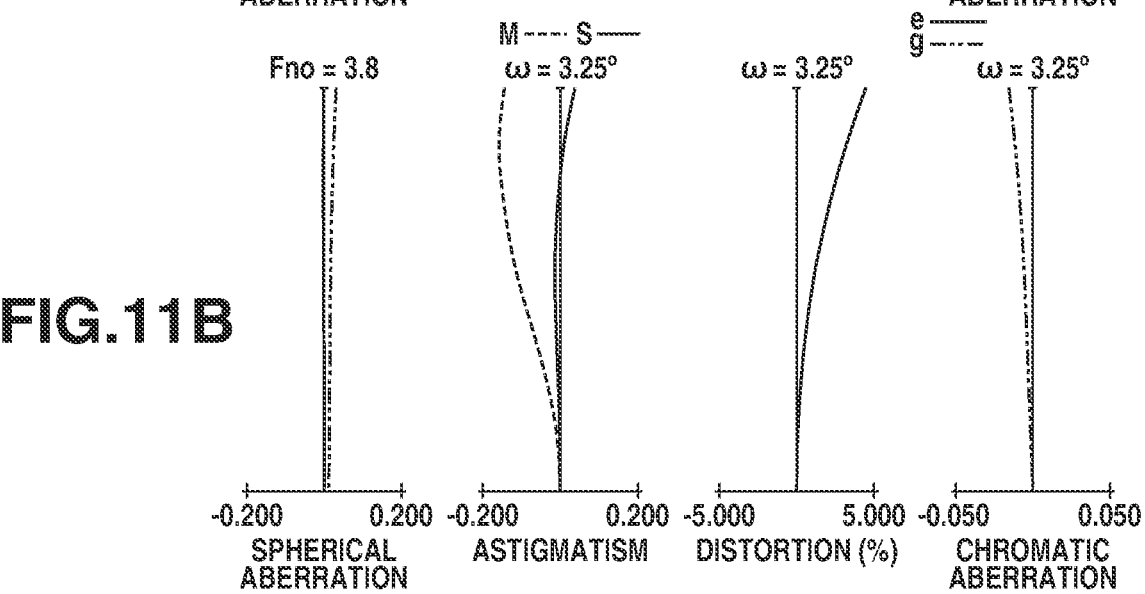
Figure 11C:
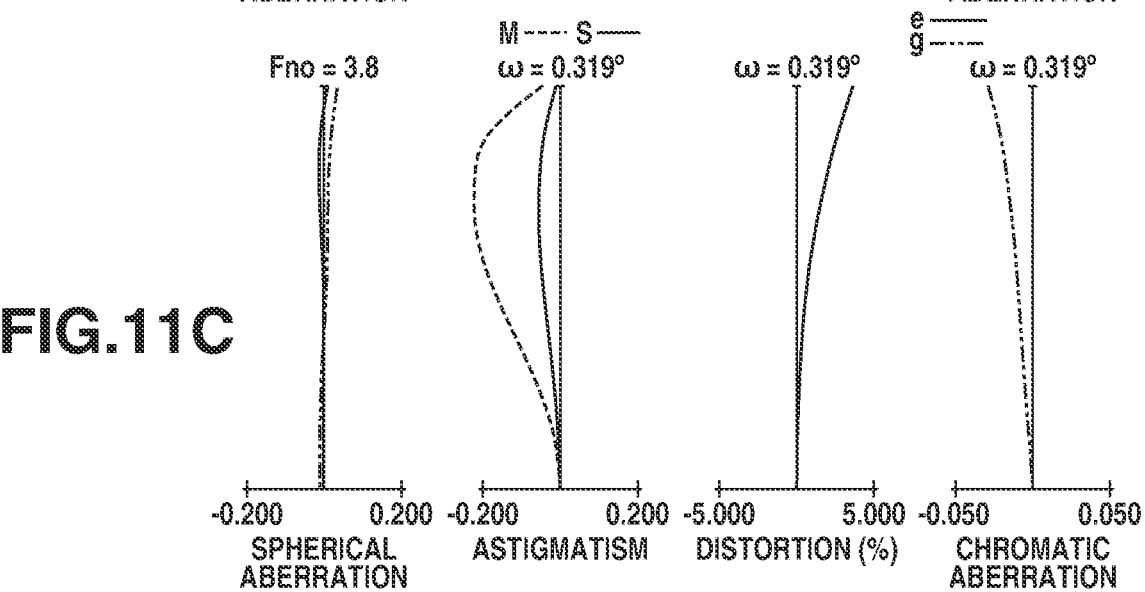

A zoom lens according to a (numerical) embodiment 4 will be described with reference to FIGS. 10A and 10B and FIGS. 11A to 11C. FIGS. 10A and 10B are diagrams illustrating cross-sectional views at the wide angle end of the zoom lens according to the embodiment 4. FIGS. 11A, 11B, and 11C are aberration charts respectively illustrating aberrations in a reflected light path at the wide angle end, the intermediate area, and the telephoto end.

The above-described aberration charts in FIGS. 2A, 2B, and 2C also illustrate aberrations in a transmitted light path at the wide angle end, the intermediate area, and the telephoto end according to the present embodiment. FIG. 10A illustrates a cross-sectional view of the zoom lens including the transmitted light path. FIG. 10A also illustrates loci of the plurality of lens groups moved when zooming is executed, and loci (moving directions) of sub-lens groups (a sub-lens group including 7th to 10th surfaces and a sub-lens group including 11th and 12th surfaces) moved when focusing is executed. FIG. 10B schematically illustrates a cross-sectional view of the zoom lens including the reflected light path. The zoom lens according to the embodiment 4 includes a first lens group L1 having positive refractive power, a second lens group L2 having negative refractive power, a third lens group L3 having positive refractive power, a fourth lens group L4 having positive refractive power, an aperture stop SP, and fifth (final) lens groups L5' and L5 having positive refractive power, which are sequentially arranged from the object side to the image side. An image pickup surface of an image pickup element such as an image sensor is arranged on an image plane IP'. A light receiving unit for adding the AF function to the zoom lens (i.e., a sensor used for auto-focusing) is arranged on an image plane IP (an image plane of the zoom lens caused by the relay unit LA). In addition, the sensor can be a phase-difference detection type sensor, although a type thereof is not limited thereto. Further, instead of or in addition to the light receiving unit, another light receiving unit for adding the above-described function other than the AF function to the zoom lens can be arranged on the image plane IP.

When zooming is executed from the wide angle end to the telephoto end, the first lens group L1 and the final lens groups L5' and L5 are not moved, the second lens group L2 is moved to the image side, and the third lens group L3 and the fourth lens group L4 are moved. The final lens group L5' includes a prism PR as a separation element which separates light into transmitted light and reflected light in order to branch a light path and a relay unit LR having positive refractive power which functions to form an image, which are sequentially arranged from the object side to the image side. The final lens group L5 includes a prism PR and a relay unit LA having positive refractive power which functions to form an image, which are sequentially arranged from the object side to the image side.

Figure 12A:
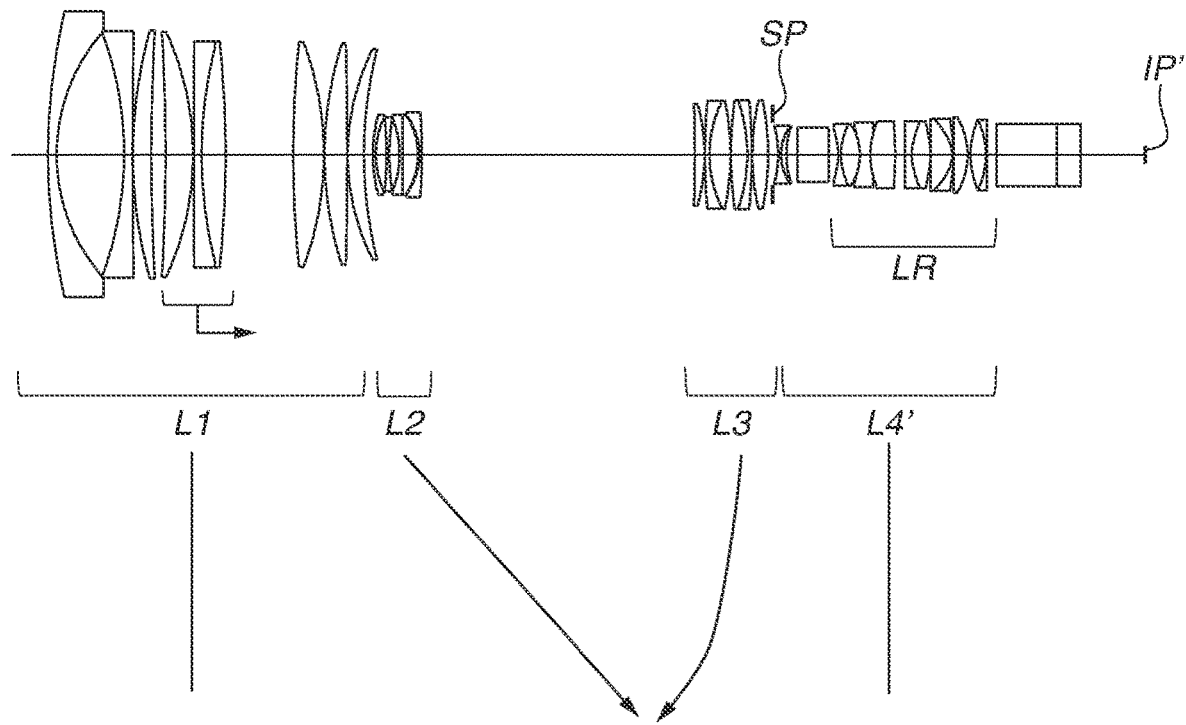
FIGS. 12A and 12B are diagrams illustrating cross-sectional views at a wide angle end of a zoom lens according to the embodiment 5.
Figure 12B:
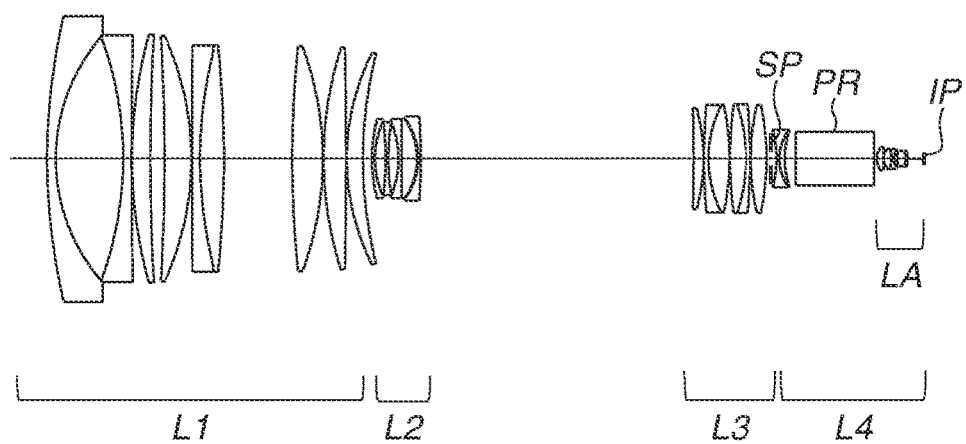
Figure 13A:
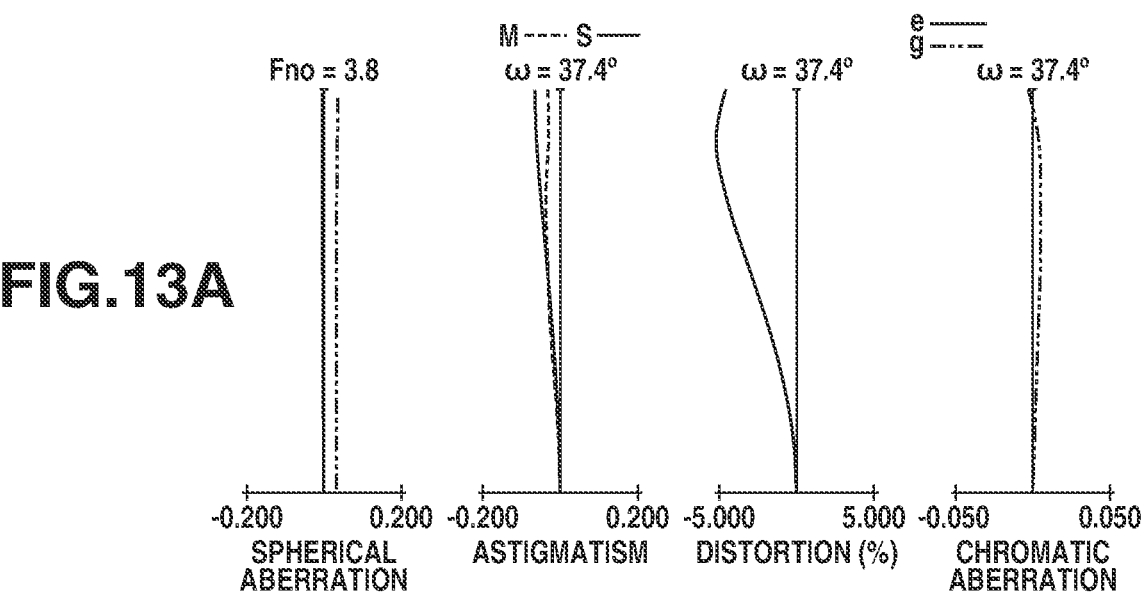
FIGS. 13A, 13B, and 13C are aberration charts illustrating aberrations in a reflected light path according to the embodiment 5.
Figure 13B:
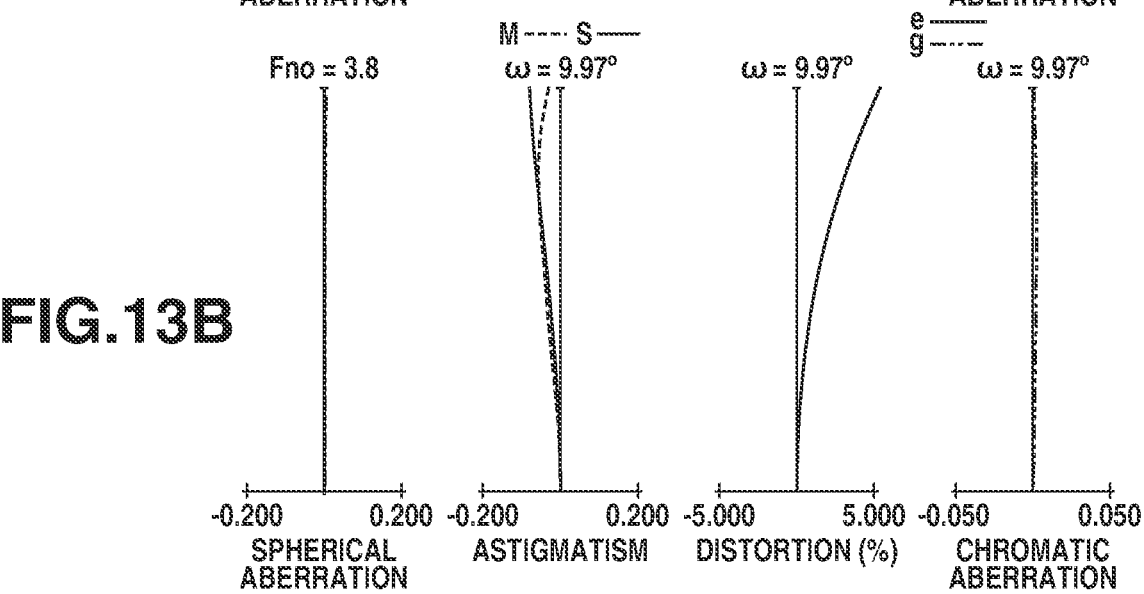
Figure 13C:
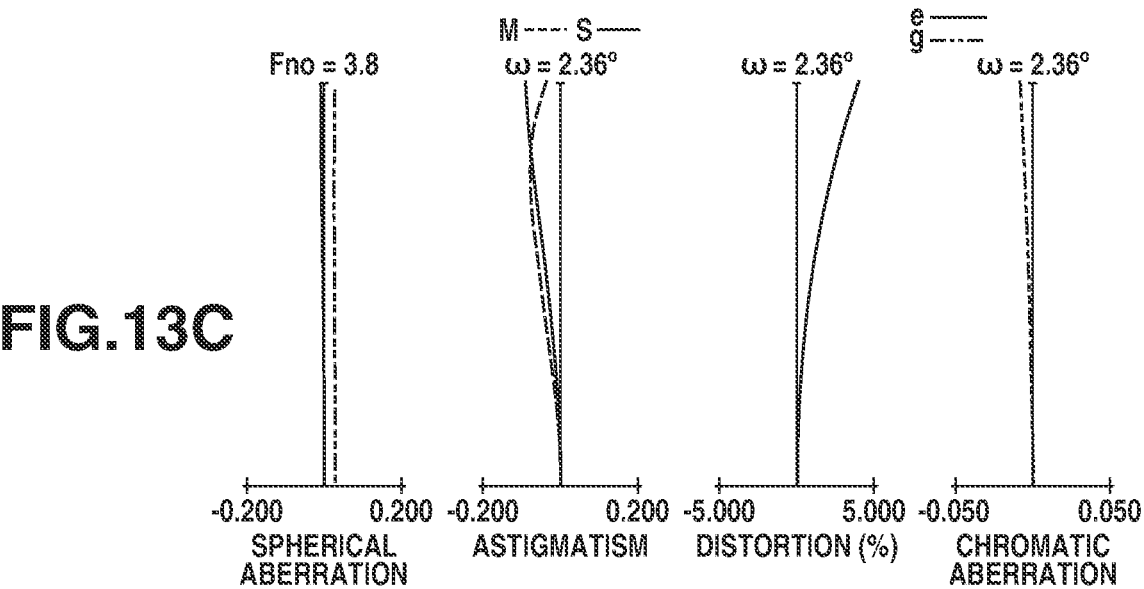

A zoom lens according to a (numerical) embodiment 5 will be described with reference to FIGS. 12A and 12B and FIGS. 13A to 13C. FIGS. 12A and 12B are diagrams illustrating cross-sectional views at the wide angle end of the zoom lens according to the embodiment 5. FIGS. 13A, 13B, and 13C are aberration charts respectively illustrating aberrations in a reflected light path at the wide angle end, the intermediate area, and the telephoto end.

The above-described aberration charts in FIGS. 5A, 5B, and 5C also illustrate aberrations in a transmitted light path at the wide angle end, the intermediate area, and the telephoto end according to the present embodiment. FIG. 12A illustrates a cross-sectional view of the zoom lens including the transmitted light path. FIG. 12A also illustrates loci of the plurality of lens groups moved when zooming is executed, and a locus (moving direction) of a sub-lens group (a sub-lens group including 7th to 11th surfaces) moved when focusing is executed.

FIG. 12B schematically illustrates a cross-sectional view of the zoom lens including the reflected light path. The zoom lens according to the embodiment 5 includes a first lens group L1 having positive refractive power, a second lens group L2 having negative refractive power, a third lens group L3 having positive refractive power, an aperture stop SP, and fourth (final) lens groups L'4 and L4 having positive refractive power, which are sequentially arranged from the object side to the image side. An image pickup surface of an image pickup element such as an image sensor is arranged on an image plane IP'. A light receiving unit (i.e., a sensor) for adding the AF function to the zoom lens is arranged on an image plane IP. Further, instead of or in addition to the light receiving unit, another light receiving unit for adding the above-described function other than the AF function to the zoom lens can be arranged on the image plane IP.

When zooming is executed from the wide angle end to the telephoto end, the first lens group L1 and the final lens groups L4' and L4 are not moved, the second lens group L2 is moved to the image side, and the third lens group L3 is moved.

The final lens group L4' includes a prism PR as a separation element which separates light into transmitted light and reflected light in order to branch a light path and a relay unit LR having positive refractive power which functions to form an image, which are sequentially arranged from the object side to the image side. The final lens group L4 includes a prism PR and a relay unit LA having positive refractive power which functions to form an image, which are sequentially arranged from the object side to the image side.

Hereinafter, numerical embodiments 1 to 5 corresponding to the above-described embodiments 1 to 5 will be described. In each of the numerical embodiments 1 to 5, r represents a curvature radius (mm) of a surface corresponding to a surface number (i-th surface), d represents a distance (a thickness of a lens or the air in mm) between the i-th surface and the (i+1)-th surface. Further, "(Variable)" described in a column of "d" indicates that a thickness of the air changes when zooming is executed, and a correspondence relationship between the thickness of the air and a focal length is described in an appended table. nd represents a refractive index of a material of the i-th optical member with respect to the d-line. vd represents an Abbe number of a material of the i-th optical member, which takes the d-line as a reference.

In addition, the Abbe number vd is defined by the following formula (A).

$$vd=(nd-1)/(nF-nC) \qquad (A)$$

Herein, nF, nd, and nC respectively represent refractive indexes of the F-line (wavelength: 486.1 nm), the d-line (wavelength: 587.6 nm), and the C-line (wavelength: 656.3 nm) of the Fraunhofer line.

Further, in each of the numerical embodiments 1 to 5, a half-angle of view (°) of the zoom lens is described, and a maximum image height corresponding to the half-angle of view is described as "Image Height". Furthermore, a focal length of each lens group is described as the lens group data. Furthermore, a back focus (mm) is described as "BF". The back focus is an air-equivalent length from an image-side surface of a lens having a refractive power (i.e., a final surface of the zoom lens) arranged closest to the image side of the zoom lens to a paraxial image plane on the optical axis. Further, "Total Length of Lens" is also described. A total length of the lens is a length obtained by adding a back focus to a distance from a forefront surface (i.e., an object-side surface of a lens arranged closest to the object side) of the zoom lens to the final surface of the zoom lens on the optical axis.

Further, "*" added to a surface number indicates that a surface corresponding to that surface number is an aspheric surface. H is a height of a point on the aspheric surface on an axis orthogonal to the optical axis, and a traveling direction of light on the optical axis is specified as a positive direction. Furthermore, R is a paraxial curvature radius of the aspheric surface, K is a conic constant, and A2 to A16 are aspheric coefficients. Then, a shift amount X from a reference spherical surface of the point at the height H on an axis parallel to the optical axis is expressed by the following formula 1.

$$X = \frac{\left(\frac{1}{R}\right)}{1+\sqrt{1(1+K)\left(\frac{H}{R}\right)^2}} + A2H^2 + A3H^3 + A4H^4 + A5H^5 \qquad [\text{Formula 1}]$$

$$+A6H^6 + A7H^7 + A8H^8 + A9H^9 + A10H^{10} + A11H^{11}$$

$$+A12H^{12} + A13H^{13} + A14H^{14} + A15H^{15} + A16H^{16}$$

In each of the numerical embodiments 1 to 5, "e±X" in each of the conic constants and the aspheric coefficients represents "×10±X".

Further, a focal length described in each of the numerical embodiments 1 to 5 is a focal length with respect to the e-line (wavelength: 546.07 nm). Furthermore, values relating to the above-described conditional expressions 1 to 4 of the numerical embodiments 1 to 5 are described in a table 1.

Numerical Embodiment 1

<Optical System including Transmitted Light Path>

Unit: mm
Surface Data

| Surface Number | r | d | nd | vd |
|---|---|---|---|---|
| 1 | −2942.188 | 6.00 | 1.83481 | 42.7 |
| 2 | 335.459 | 1.80 | | |
| 3 | 335.066 | 23.71 | 1.43387 | 95.1 |
| 4 | −1057.929 | 0.20 | | |
| 5 | 525.299 | 14.68 | 1.43387 | 95.1 |
| 6 | −2449.905 | 25.25 | | |
| 7 | 377.042 | 20.53 | 1.43387 | 95.1 |
| 8 | −1365.497 | 0.25 | | |
| 9 | 306.954 | 16.16 | 1.43387 | 95.1 |
| 10 | 1716.232 | 1.50 | | |
| 11 | 188.244 | 16.19 | 1.43875 | 94.7 |
| 12 | 408.078 | (Variable) | | |
| 13* | −532.824 | 2.20 | 2.00330 | 28.3 |
| 14 | 38.132 | 11.72 | | |
| 15 | −44.546 | 1.45 | 1.74320 | 49.3 |
| 16 | 72.565 | 9.77 | 1.89286 | 20.4 |
| 17 | −46.484 | 1.63 | | |
| 18 | −41.758 | 2.00 | 1.88300 | 40.8 |
| 19 | −152.608 | (Variable) | | |
| 20 | 152.336 | 11.49 | 1.72916 | 54.7 |
| 21* | −265.715 | 6.62 | | |
| 22 | 139.888 | 13.50 | 1.43875 | 94.7 |
| 23 | −246.304 | 0.50 | | |
| 24 | 264.094 | 2.60 | 1.85478 | 24.8 |
| 25 | 97.106 | (Variable) | | |
| 26 | 86.506 | 15.39 | 1.49700 | 81.5 |
| 27 | −236.969 | 0.50 | | |
| 28 | 415.877 | 2.50 | 1.80518 | 25.4 |
| 29 | 139.362 | 7.85 | 1.60311 | 60.6 |
| 30* | −764.201 | (Variable) | | |
| 31 (Aperture) | ∞ | 5.46 | | |
| 32 | −100.588 | 1.40 | 1.88300 | 40.8 |
| 33 | 50.285 | 1.36 | | |
| 34 | 40.817 | 3.60 | 1.92286 | 18.9 |
| 35 | 96.042 | 4.19 | | |
| 36 | −79.866 | 1.70 | 1.80400 | 46.5 |
| 37 | −114.439 | 5.00 | | |
| 38 | ∞ | 17.45 | 1.83481 | 42.7 |
| 39 | ∞ | 1.50 | | |
| 40 | 471.053 | 2.00 | 2.00100 | 29.1 |
| 41 | 61.204 | 5.25 | | |
| 42 | −154.723 | 1.50 | 1.88300 | 40.8 |
| 43 | 48.981 | 6.45 | 1.84666 | 23.8 |
| 44 | −66.247 | 0.20 | | |
| 45 | −246.690 | 9.17 | 1.43875 | 94.7 |
| 46 | −32.301 | 0.20 | | |
| 47 | −62.829 | 8.38 | 1.81600 | 46.6 |
| 48 | −21.384 | 1.50 | 2.00100 | 29.1 |
| 49 | −126.267 | 8.68 | | |
| 50 | −1310.821 | 1.40 | 1.83481 | 42.7 |
| 51 | 36.358 | 7.90 | 1.80518 | 25.4 |
| 52 | −196.957 | 0.28 | | |
| 53 | 146.796 | 7.95 | 1.48749 | 70.2 |
| 54 | −38.232 | 1.62 | 2.00100 | 29.1 |
| 55 | −82.855 | 0.99 | | |
| 56 | −132.295 | 5.94 | 1.60562 | 43.7 |
| 57 | −40.442 | 0.22 | | |
| 58 | 109.076 | 6.96 | 1.64000 | 60.1 |
| 59 | −47.080 | 1.62 | 2.00100 | 29.1 |
| 60 | −140.064 | 9.82 | | |
| 61 | ∞ | 33.00 | 1.60859 | 46.4 |
| 62 | ∞ | 13.20 | 1.51633 | 64.2 |
| 63 | ∞ | (Variable) | | |
| Image Plane | ∞ | | | |

Aspheric Surface Data

The 13th Surface

K = 1.99852e+000
A4 = 1.15677e−006

-continued

A6 = −2.75064e−008
A8 = −3.06848e−010
A10 = 9.10515e−013
A12 = 3.28486e−015
A14 = 1.35261e−018
A16 = 5.54400e−022
A3 = 2.74335e−007
A5 = 9.95673e−008
A7 = 4.02226e−009
A9 = 6.12079e−012
A11 = −8.52506e−014
A13 = −6.85632e−017
A15 = −3.84859e−020

The 21st Surface

K = 1.21093e+001
A4 = 2.82183e−007
A6 = −5.59441e−011
A8 = −2.00796e−014
A10 = 9.78964e−017
A12 = −6.30815e−020
A14 = 1.70834e−023
A16 = −4.73901e−027
A3 = −2.90901e−008
A5 = 1.58196e−009
A7 = 1.10620e−012
A9 = −1.50730e−015
A11 = 5.86871e−020
A13 = 1.04584e−022
A15 = 1.44467e−025

The 30th Surface

K = −2.23400e+002
A4 = 2.77687e−007
A6 = 4.69555e−010
A8 = 1.39733e−013
A10 = −2.98156e−016
A12 = 4.58582e−019
A14 = −2.25443e−022
A16 = 5.80568e−026
A3 = 1.70768e−007
A5 = −5.73181e−009
A7 = −1.36230e−011
A9 = 7.92918e−015
A11 = −8.14405e−018
A13 = 2.06016e−021
A15 = −8.57551e−025

Various Data
Zoom Ratio: 120.00

|  | Wide Angle End | Intermediate Area | Telephoto End |
|---|---|---|---|
| Focal Distance | 8.50 | 100.01 | 1020.12 |
| F-Number | 1.75 | 1.75 | 5.25 |
| Angle of View | 32.90 | 3.15 | 0.31 |
| Image Height | 5.50 | 5.50 | 5.50 |
| Total Length of Lens | 687.65 | 687.65 | 687.65 |
| BF | 51.79 | 51.79 | 51.79 |
| d12 | 3.47 | 154.53 | 194.08 |
| d19 | 289.33 | 96.92 | 2.00 |
| d25 | 4.21 | 10.30 | 4.50 |
| d30 | 2.99 | 38.24 | 99.42 |
| d63 | 12.80 | 12.80 | 12.80 |

Zoom Lens Group Data

| Group | Beginning Surface | Focal Distance |
|---|---|---|
| 1 | 1 | 251.50 |
| 2 | 13 | −24.07 |
| 3 | 20 | 134.62 |
| 4 | 26 | 112.37 |
| 5 | 31 | 35.15 |

-continued

<Optical System including Reflected Light Path (which follows Separation Element PR)>

Unit: mm
Surface Data

| Surface Number | r | d | nd | vd |
|---|---|---|---|---|
| 38 | ∞ | 40.88 | 1.83481 | 42.7 |
| 39 | ∞ | 1.47 | | |
| 40 | 10.377 | 5.59 | 1.49700 | 81.5 |
| 41 | −1045.456 | 0.20 | | |
| 42 | 9.920 | 4.80 | 1.49700 | 81.5 |
| 43 | −15.113 | 1.50 | 1.95375 | 32.3 |
| 44 | 6.432 | 3.02 | | |
| 45 | 15.953 | 5.24 | 1.85025 | 30.1 |
| 46 | −5.936 | 0.70 | 1.81600 | 46.6 |
| 47 | 109.674 | (Variable) | | |
| Image Plane | ∞ | | | |

Various Data

| | Wide Angle End | Intermediate Area | Telephoto End |
|---|---|---|---|
| Focal Distance | 5.51 | 64.85 | 661.44 |
| F-Number | 3.80 | 3.80 | 3.79 |
| Angle of View | 32.97 | 3.16 | 0.31 |
| Image Height | 3.58 | 3.58 | 3.58 |
| Total Length of Lens | 609.84 | 609.84 | 609.84 |
| BF | 7.73 | 7.73 | 7.73 |
| d12 | 3.47 | 154.53 | 194.08 |
| d19 | 289.33 | 96.92 | 2.00 |
| d25 | 4.21 | 10.30 | 4.50 |
| d30 | 2.99 | 38.24 | 99.42 |
| d47 | 7.73 | 7.73 | 7.73 |

Zoom Lens Group Data

| Group | Beginning Surface | Focal Distance |
|---|---|---|
| 5 | 31 | 47.42 |

Numerical Embodiment 2

<Optical System Including Transmitted Light Path>

Unit: mm
Surface Data

| Surface Number | r | d | nd | vd |
|---|---|---|---|---|
| 1 | 335.346 | 4.70 | 1.77250 | 49.6 |
| 2 | 100.786 | 37.33 | | |
| 3 | −190.279 | 4.50 | 1.77250 | 49.6 |
| 4 | 3222.942 | 0.15 | | |
| 5 | 251.152 | 10.21 | 1.71736 | 29.5 |
| 6 | 1141.804 | 7.82 | | |
| 7 | −1097.861 | 15.33 | 1.49700 | 81.5 |
| 8 | −157.636 | 0.20 | | |
| 9 | 16423.763 | 4.40 | 1.80518 | 25.4 |
| 10 | 240.582 | 13.15 | 1.49700 | 81.5 |
| 11 | −568.448 | 37.36 | | |
| 12 | 564.340 | 17.16 | 1.43387 | 95.1 |
| 13 | −171.752 | 0.15 | | |
| 14 | 195.384 | 12.55 | 1.43387 | 95.1 |
| 15 | −2522.933 | 0.15 | | |
| 16 | 126.181 | 8.98 | 1.61800 | 63.3 |
| 17 | 227.998 | (Variable) | | |
| 18 | 84.740 | 1.50 | 1.88300 | 40.8 |
| 19 | 47.202 | 6.00 | | |
| 20 | −175.088 | 1.50 | 1.77250 | 49.6 |
| 21 | 125.630 | 5.65 | | |
| 22 | −52.258 | 1.50 | 1.77250 | 49.6 |
| 23 | 1040.028 | 8.71 | 1.80810 | 22.8 |
| 24 | −38.455 | 0.66 | | |

-continued

| | | | | |
|---|---|---|---|---|
| 25 | −36.242 | 1.50 | 1.81600 | 46.6 |
| 26 | −249.875 | (Variable) | | |
| 27 | −758.136 | 5.45 | 1.61800 | 63.3 |
| 28* | −99.462 | 0.20 | | |
| 29 | 355.782 | 2.50 | 1.72047 | 34.7 |
| 30 | 65.376 | 11.59 | 1.61800 | 63.3 |
| 31 | −144.731 | 0.20 | | |
| 32 | 213.940 | 9.07 | 1.60311 | 60.6 |
| 33 | −87.683 | 2.50 | 1.84666 | 23.9 |
| 34 | −280.740 | 0.20 | | |
| 35 | 128.221 | 8.81 | 1.62041 | 60.3 |
| 36 | −137.702 | (Variable) | | |
| 37 (Aperture) | ∞ | 3.32 | | |
| 38 | −58.030 | 1.50 | 1.60300 | 65.4 |
| 39 | 27.203 | 3.07 | 1.72047 | 34.7 |
| 40 | 47.944 | 6.04 | | |
| 41 | ∞ | 17.45 | 1.83481 | 42.7 |
| 42 | ∞ | 5.41 | | |
| 43 | −44.210 | 1.20 | 1.81600 | 46.6 |
| 44 | 35.063 | 10.43 | 1.72825 | 28.5 |
| 45 | −32.800 | 0.15 | | |
| 46 | −51.153 | 6.32 | 1.83481 | 42.7 |
| 47 | 137.443 | 0.15 | | |
| 48 | 56.922 | 13.40 | 1.71736 | 29.5 |
| 49 | −157.402 | 5.09 | | |
| 50 | −4938.972 | 4.00 | 1.75500 | 52.3 |
| 51 | 41.983 | 10.15 | 1.51823 | 58.9 |
| 52 | −68.541 | 0.15 | | |
| 53 | −1378.843 | 11.20 | 1.51633 | 64.1 |
| 54 | −25.522 | 1.40 | 1.85025 | 30.1 |
| 55 | −105.630 | 0.15 | | |
| 56 | 657.299 | 8.05 | 1.51633 | 64.1 |
| 57 | −36.928 | 0.99 | | |
| 58 | 50.711 | 8.39 | 1.53996 | 59.5 |
| 59 | −55.709 | 1.42 | 1.84666 | 23.9 |
| 60 | −706.357 | 5.00 | | |
| 61 | ∞ | 33.00 | 1.60859 | 46.4 |
| 62 | ∞ | 13.20 | 1.51633 | 64.2 |
| 63 | ∞ | (Variable) | | |
| Image Plane | ∞ | | | |

Aspheric Surface Data

The 28th Surface $K = 0.00000e+000$
$A4 = 2.32112e-007$
$A6 = 2.35378e-010$
$A8 = -2.98860e-013$
$A10 = 1.74212e-016$ Various Data
Zoom Ratio: 18.50

| | Wide Angle End | Intermediate Area | Telephoto End |
|---|---|---|---|
| Focal Distance | 7.20 | 31.29 | 133.17 |
| F-Number | 1.54 | 1.54 | 1.85 |
| Angle of View | 37.38 | 9.97 | 2.36 |
| Image Height | 5.50 | 5.50 | 5.50 |
| Total Length of Lens | 565.91 | 565.91 | 565.91 |
| BF | 47.07 | 47.07 | 47.07 |
| d17 | 5.08 | 79.08 | 112.22 |
| d26 | 150.47 | 62.77 | 4.53 |
| d36 | 2.15 | 15.84 | 40.95 |
| d63 | 12.90 | 12.90 | 12.90 |

Zoom Lens Group Data

| Group | Beginning Surface | Focal Distance |
|---|---|---|
| 1 | 1 | 113.04 |
| 2 | 18 | −29.50 |
| 3 | 27 | 49.00 |
| 4 | 37 | 30.04 |

-continued

<Optical System including Reflected Light Path (which follows Separation Element PR)>

Unit: mm
Surface Data

| Surface Number | r | d | nd | vd |
|---|---|---|---|---|
| 41 | ∞ | 40.88 | 1.83481 | 42.7 |
| 42 | ∞ | 1.47 | | |
| 43 | 10.154 | 4.19 | 1.63980 | 34.5 |
| 44 | 61.568 | 0.20 | | |
| 45 | 9.214 | 4.35 | 1.43875 | 94.7 |
| 46 | −28.583 | 1.50 | 2.00100 | 29.1 |
| 47 | 6.397 | 2.04 | | |
| 48 | 11.022 | 5.32 | 1.64000 | 60.1 |
| 49 | −6.337 | 0.70 | 1.95375 | 32.3 |
| 50 | −19.947 | (Variable) | | |
| Image Plane | ∞ | | | |

| | Wide Angle End | Intermediate Area | Telephoto End |
|---|---|---|---|
| Focal Distance | 4.88 | 21.19 | 90.19 |
| F-Number | 3.80 | 3.80 | 3.80 |
| Angle of View | 36.25 | 9.58 | 2.27 |
| Image Height | 3.58 | 3.58 | 3.58 |
| Total Length of Lens | 483.57 | 483.57 | 483.57 |
| BF | 9.61 | 9.61 | 9.61 |
| d17 | 5.08 | 79.08 | 112.22 |
| d26 | 150.47 | 62.77 | 4.53 |
| d36 | 2.15 | 15.84 | 40.95 |
| d50 | 9.61 | 9.61 | 9.61 |

Zoom Lens Group Data

| Group | Beginning Surface | Focal Distance |
|---|---|---|
| 4 | 37 | 38.17 |

Numerical Embodiment 3

<Optical System Including Transmitted Light Path>

Unit: mm
Surface Data

| Surface Number | r | d | nd | vd |
|---|---|---|---|---|
| 1 | −190.007 | 2.30 | 1.72047 | 34.7 |
| 2 | 156.768 | 4.87 | | |
| 3 | 694.892 | 2.20 | 1.84666 | 23.8 |
| 4 | 275.524 | 8.70 | 1.43875 | 94.9 |
| 5 | −179.515 | 0.40 | | |
| 6 | 166.357 | 10.90 | 1.43387 | 95.1 |
| 7 | −137.515 | 7.02 | | |
| 8 | 130.075 | 7.65 | 1.59240 | 68.3 |
| 9 | −477.969 | 0.15 | | |
| 10 | 62.052 | 6.20 | 1.72916 | 54.7 |
| 11 | 125.670 | (Variable) | | |
| 12 | 65.339 | 1.00 | 1.88300 | 40.8 |
| 13 | 14.550 | 6.16 | | |
| 14 | −44.448 | 6.77 | 1.80810 | 22.8 |
| 15 | −12.423 | 0.75 | 1.88300 | 40.8 |
| 16 | 88.606 | 0.18 | | |
| 17 | 30.523 | 2.44 | 1.66680 | 33.0 |
| 18 | 92.262 | (Variable) | | |
| 19 | −37.712 | 0.75 | 1.75700 | 47.8 |
| 20 | 67.757 | 2.32 | 1.84649 | 23.9 |
| 21 | −717.839 | (Variable) | | |
| 22 | 93.745 | 4.84 | 1.64000 | 60.1 |
| 23* | −45.035 | (Variable) | | |
| 24 (Aperture) | ∞ | 2.00 | | |
| 25 | 56.188 | 6.38 | 1.51742 | 52.4 |
| 26 | −36.997 | 1.00 | 1.83400 | 37.2 |
| 27 | −181.518 | 3.00 | | |

-continued

| | | | | |
|---|---|---|---|---|
| 28 | ∞ | 17.45 | 1.83481 | 42.7 |
| 29 | ∞ | 17.27 | | |
| 30 | −50.475 | 3.08 | 1.59551 | 39.2 |
| 31 | −31.933 | 0.14 | | |
| 32 | −153.829 | 0.80 | 1.80100 | 35.0 |
| 33 | 36.989 | 5.20 | 1.51823 | 58.9 |
| 34 | −76.826 | 0.15 | | |
| 35 | 100.830 | 6.31 | 1.48749 | 70.2 |
| 36 | −24.223 | 0.85 | 1.88300 | 40.8 |
| 37 | −69.487 | 0.22 | | |
| 38 | 55.839 | 4.17 | 1.51633 | 64.1 |
| 39 | −68.775 | 4.50 | | |
| 40 | ∞ | 33.00 | 1.60859 | 46.4 |
| 41 | ∞ | 13.20 | 1.51633 | 64.1 |
| 42 | ∞ | (Variable) | | |
| Image Plane | ∞ | | | |

Aspheric Surface Data

The 23rd Surface $K = -6.95534e-001$
$A4 = 1.29096e-006$
$A6 = 3.74923e-010$
$A8 = 5.46374e-012$
$A10 = -1.71339e-014$
$A12 = 9.53627e-018$ Various Data
Zoom Ratio: 21.81

| | Wide Angle End | Intermediate Area | Telephoto End |
|---|---|---|---|
| Focal Distance | 7.80 | 25.80 | 170.11 |
| F-Number | 1.80 | 1.80 | 2.68 |
| Angle of View | 35.19 | 12.03 | 1.85 |
| Image Height | 5.50 | 5.50 | 5.50 |
| Total Length of Lens | 255.00 | 255.00 | 255.00 |
| BF | 40.62 | 40.62 | 40.62 |
| d11 | 0.39 | 33.23 | 55.49 |
| d18 | 60.06 | 13.48 | 11.78 |
| d21 | 6.57 | 15.95 | 1.42 |
| d23 | 3.75 | 8.10 | 2.06 |
| d42 | 6.95 | 6.95 | 6.95 |

Zoom Lens Group Data

| Group | Beginning Surface | Focal Distance |
|---|---|---|
| 1 | 1 | 71.50 |
| 2 | 12 | −13.80 |
| 3 | 19 | −57.00 |
| 4 | 22 | 48.00 |
| 5 | 24 | 51.04 |

<Optical System including Reflected Light Path (which follows Separation Element PR)>

Unit: mm
Surface Data

| Surface Number | r | d | nd | vd |
|---|---|---|---|---|
| 28 | ∞ | 40.88 | 1.83481 | 42.7 |
| 29 | ∞ | 0.78 | | |
| 30 | 10.673 | 5.07 | 1.49700 | 81.5 |
| 31 | −70.351 | 0.20 | | |
| 32 | 9.488 | 4.24 | 1.49700 | 81.5 |
| 33 | −15.585 | 2.00 | 1.95375 | 32.3 |
| 34 | 6.711 | 4.85 | | |

-continued

|   | 35 | 28.666 | 4.04 | 1.85025 | 30.1 |
|---|----|--------|------|---------|------|
|   | 36 | −6.467 | 0.70 | 1.81600 | 46.6 |
|   | 37 | −93.291 | (Variable) | | |
|   | Image Plane | ∞ | | | |

|  | Wide Angle End | Intermediate Area | Telephoto End |
|---|---|---|---|
| Focal Distance | 5.07 | 16.77 | 110.57 |
| F-Number | 3.80 | 3.80 | 3.79 |
| Angle of View | 35.19 | 12.03 | 1.85 |
| Image Height | 3.58 | 3.58 | 3.58 |
| Total Length of Lens | 229.35 | 229.35 | 229.35 |
| BF | 7.85 | 7.85 | 7.85 |
| d11 | 0.39 | 33.23 | 55.49 |
| d18 | 60.06 | 13.48 | 11.78 |
| d21 | 6.57 | 15.95 | 1.42 |
| d23 | 3.75 | 8.10 | 2.06 |
| d37 | 7.85 | 7.85 | 7.85 |

Zoom Lens Group Data

| Group | Beginning Surface | Focal Distance |
|---|---|---|
| 5 | 24 | 32.97 |

Numerical Embodiment 4

<Optical System Including Transmitted Light Path>

Unit: mm
Surface Data

| Surface Number | r | d | nd | vd |
|---|---|---|---|---|
| 1 | −2942.188 | 6.00 | 1.83481 | 42.7 |
| 2 | 335.459 | 1.80 | | |
| 3 | 335.066 | 23.71 | 1.43387 | 95.1 |
| 4 | −1057.929 | 0.20 | | |
| 5 | 525.299 | 14.68 | 1.43387 | 95.1 |
| 6 | −2449.905 | 25.25 | | |
| 7 | 377.042 | 20.53 | 1.43387 | 95.1 |
| 8 | −1365.497 | 0.25 | | |
| 9 | 306.954 | 16.16 | 1.43387 | 95.1 |
| 10 | 1716.232 | 1.50 | | |
| 11 | 188.244 | 16.19 | 1.43875 | 94.7 |
| 12 | 408.078 | (Variable) | | |
| 13* | −532.824 | 2.20 | 2.00330 | 28.3 |
| 14 | 38.132 | 11.72 | | |
| 15 | −44.546 | 1.45 | 1.74320 | 49.3 |
| 16 | 72.565 | 9.77 | 1.89286 | 20.4 |
| 17 | −46.484 | 1.63 | | |
| 18 | −41.758 | 2.00 | 1.88300 | 40.8 |
| 19 | −152.608 | (Variable) | | |
| 20 | 152.336 | 11.49 | 1.72916 | 54.7 |
| 21* | −265.715 | 6.62 | | |
| 22 | 139.888 | 13.50 | 1.43875 | 94.7 |
| 23 | −246.304 | 0.50 | | |
| 24 | 264.094 | 2.60 | 1.85478 | 24.8 |
| 25 | 97.106 | (Variable) | | |
| 26 | 86.506 | 15.39 | 1.49700 | 81.5 |
| 27 | −236.969 | 0.50 | | |
| 28 | 415.877 | 2.50 | 1.80518 | 25.4 |
| 29 | 139.362 | 7.85 | 1.60311 | 60.6 |
| 30* | −764.201 | (Variable) | | |
| 31 (Aperture) | ∞ | 5.46 | | |
| 32 | −100.588 | 1.40 | 1.88300 | 40.8 |
| 33 | 50.285 | 1.36 | | |
| 34 | 40.817 | 3.60 | 1.92286 | 18.9 |
| 35 | 96.042 | 4.19 | | |
| 36 | −79.866 | 1.70 | 1.80400 | 46.5 |
| 37 | −114.439 | 5.00 | | |
| 38 | ∞ | 17.45 | 1.83481 | 42.7 |
| 39 | ∞ | 1.50 | | |
| 40 | 471.053 | 2.00 | 2.00100 | 29.1 |
| 41 | 61.204 | 5.25 | | |

-continued

| | | | | |
|---|---|---|---|---|
| 42 | −154.723 | 1.50 | 1.88300 | 40.8 |
| 43 | 48.981 | 6.45 | 1.84666 | 23.8 |
| 44 | −66.247 | 0.20 | | |
| 45 | −246.690 | 9.17 | 1.43875 | 94.7 |
| 46 | −32.301 | 0.20 | | |
| 47 | −62.829 | 8.38 | 1.81600 | 46.6 |
| 48 | −21.384 | 1.50 | 2.00100 | 29.1 |
| 49 | −126.267 | 8.68 | | |
| 50 | −1310.821 | 1.40 | 1.83481 | 42.7 |
| 51 | 36.358 | 7.90 | 1.80518 | 25.4 |
| 52 | −196.957 | 0.28 | | |
| 53 | 146.796 | 7.95 | 1.48749 | 70.2 |
| 54 | −38.232 | 1.62 | 2.00100 | 29.1 |
| 55 | −82.855 | 0.99 | | |
| 56 | −132.295 | 5.94 | 1.60562 | 43.7 |
| 57 | −40.442 | 0.22 | | |
| 58 | 109.076 | 6.96 | 1.64000 | 60.1 |
| 59 | −47.080 | 1.62 | 2.00100 | 29.1 |
| 60 | −140.064 | 9.82 | | |
| 61 | ∞ | 33.00 | 1.60859 | 46.4 |
| 62 | ∞ | 13.20 | 1.51633 | 64.2 |
| 63 | ∞ | (Variable) | | |
| Image Plane | ∞ | | | |

Aspheric Surface Data

The 13th Surface $K = 1.99852e+000$
$A4 = 1.15677e-006$
$A6 = -2.75064e-008$
$A8 = -3.06848e-010$
$A10 = 9.10515e-013$
$A12 = 3.28486e-015$
$A14 = 1.35261e-018$
$A16 = 5.54400e-022$
$A3 = 2.74335e-007$
$A5 = 9.95673e-008$
$A7 = 4.02226e-009$
$A9 = 6.12079e-012$
$A11 = -8.52506e-014$
$A13 = -6.85632e-017$
$A15 = -3.84859e-020$ The 21st Surface $K = 1.21093e+001$
$A4 = 2.82183e-007$
$A6 = -5.59441e-011$
$A8 = -2.00796e-014$
$A10 = 9.78964e-017$
$A12 = -6.30815e-020$
$A14 = 1.70834e-023$
$A16 = -4.73901e-027$
$A3 = -2.90901e-008$
$A5 = 1.58196e-009$
$A7 = 1.10620e-012$
$A9 = -1.50730e-015$
$A11 = 5.86871e-020$
$A13 = 1.04584e-022$
$A15 = 1.44467e-025$ The 30th Surface $K = -2.23400e+002$
$A4 = 2.77687e-007$
$A6 = 4.69555e-010$
$A8 = 1.39733e-013$
$A10 = -2.98156e-016$
$A12 = 4.58582e-019$
$A14 = -2.25443e-022$
$A16 = 5.80568e-026$
$A3 = 1.70768e-007$
$A5 = -5.73181e-009$
$A7 = -1.36230e-011$
$A9 = 7.92918e-015$
$A11 = -8.14405e-018$
$A13 = 2.06016e-021$
$A15 = -8.57551e-025$ -continued

|  | Various Data<br>Zoom Ratio: 120.00 | | |
| --- | --- | --- | --- |
|  | Wide Angle<br>End | Intermediate<br>Area | Telephoto<br>End |
| Focal Distance | 8.50 | 100.01 | 1020.12 |
| F-Number | 1.75 | 1.75 | 5.25 |
| Angle of View | 32.90 | 3.15 | 0.31 |
| Image Height | 5.50 | 5.50 | 5.50 |
| Total Length of Lens | 687.65 | 687.65 | 687.65 |
| BF | 51.79 | 51.79 | 51.79 |
| d12 | 3.47 | 154.53 | 194.08 |
| d19 | 289.33 | 96.92 | 2.00 |
| d25 | 4.21 | 10.30 | 4.50 |
| d30 | 2.99 | 38.24 | 99.42 |
| d63 | 12.80 | 12.80 | 12.80 |

| Zoom Lens Group Data | | |
| --- | --- | --- |
| Group | Beginning Surface | Focal Distance |
| 1 | 1 | 251.50 |
| 2 | 13 | −24.07 |
| 3 | 20 | 134.62 |
| 4 | 26 | 112.37 |
| 5 | 31 | 35.15 |

<Optical System including Reflected Light Path (which follows Separation Element PR)>

| Unit: mm<br>Surface Data | | | | |
| --- | --- | --- | --- | --- |
| Surface Number | r | d | nd | vd |
| 38 | ∞ | 38.00 | 1.83481 | 42.7 |
| 39 | ∞ | 1.47 | | |
| 40 | 10.880 | 4.64 | 1.49700 | 81.5 |
| 41 | −170.491 | 0.20 | | |
| 42 | 9.304 | 5.36 | 1.48749 | 70.2 |
| 43 | −16.117 | 1.50 | 1.90525 | 35.0 |
| 44 | 5.984 | 7.99 | | |
| 45 | 15.392 | 5.08 | 1.85025 | 30.1 |
| 46 | −7.155 | 0.70 | 1.81600 | 46.6 |
| 47 | 38.476 | (Variable) | | |
| Image Plane | ∞ | | | |

|  | Wide Angle<br>End | Intermediate<br>Area | Telephoto<br>End |
| --- | --- | --- | --- |
| Focal Distance | 5.77 | 67.84 | 691.97 |
| F-Number | 3.80 | 3.80 | 3.80 |
| Angle of View | 33.73 | 3.25 | 0.32 |
| Image Height | 3.85 | 3.85 | 3.85 |
| Total Length of Lens | 607.49 | 607.49 | 607.49 |
| BF | 3.85 | 3.85 | 3.85 |
| d12 | 3.47 | 154.53 | 194.08 |
| d19 | 289.33 | 96.92 | 2.00 |
| d25 | 4.21 | 10.30 | 4.50 |
| d30 | 2.99 | 38.24 | 99.42 |
| d47 | 3.85 | 3.85 | 3.85 |

| Zoom Lens Group Data | | |
| --- | --- | --- |
| Group | Beginning Surface | Focal Distance |
| 5 | 31 | 43.38 |

Numerical Embodiment 5

<Optical System Including Transmitted Light Path>

Unit: mm
Surface Data

| Surface Number | r | d | nd | vd |
|---|---|---|---|---|
| 1 | 335.346 | 4.70 | 1.77250 | 49.6 |
| 2 | 100.786 | 37.33 | | |
| 3 | −190.279 | 4.50 | 1.77250 | 49.6 |
| 4 | 3222.942 | 0.15 | | |
| 5 | 251.152 | 10.21 | 1.71736 | 29.5 |
| 6 | 1141.804 | 7.82 | | |
| 7 | −1097.861 | 15.33 | 1.49700 | 81.5 |
| 8 | −157.636 | 0.20 | | |
| 9 | 16423.763 | 4.40 | 1.80518 | 25.4 |
| 10 | 240.582 | 13.15 | 1.49700 | 81.5 |
| 11 | −568.448 | 37.36 | | |
| 12 | 564.340 | 17.16 | 1.43387 | 95.1 |
| 13 | −171.752 | 0.15 | | |
| 14 | 195.384 | 12.55 | 1.43387 | 95.1 |
| 15 | −2522.933 | 0.15 | | |
| 16 | 126.181 | 8.98 | 1.61800 | 63.3 |
| 17 | 227.998 | (Variable) | | |
| 18 | 84.740 | 1.50 | 1.88300 | 40.8 |
| 19 | 47.202 | 6.00 | | |
| 20 | −175.088 | 1.50 | 1.77250 | 49.6 |
| 21 | 125.630 | 5.65 | | |
| 22 | −52.258 | 1.50 | 1.77250 | 49.6 |
| 23 | 1040.028 | 8.71 | 1.80810 | 22.8 |
| 24 | −38.455 | 0.66 | | |
| 25 | −36.242 | 1.50 | 1.81600 | 46.6 |
| 26 | −249.875 | (Variable) | | |
| 27 | −758.136 | 5.45 | 1.61800 | 63.3 |
| 28* | −99.462 | 0.20 | | |
| 29 | 355.782 | 2.50 | 1.72047 | 34.7 |
| 30 | 65.376 | 11.59 | 1.61800 | 63.3 |
| 31 | −144.731 | 0.20 | | |
| 32 | 213.940 | 9.07 | 1.60311 | 60.6 |
| 33 | −87.683 | 2.50 | 1.84666 | 23.9 |
| 34 | −280.740 | 0.20 | | |
| 35 | 128.221 | 8.81 | 1.62041 | 60.3 |
| 36 | −137.702 | (Variable) | | |
| 37 (Aperture) | ∞ | 3.32 | | |
| 38 | −58.030 | 1.50 | 1.60300 | 65.4 |
| 39 | 27.203 | 3.07 | 1.72047 | 34.7 |
| 40 | 47.944 | 6.04 | | |
| 41 | ∞ | 17.45 | 1.83481 | 42.7 |
| 42 | ∞ | 5.41 | | |
| 43 | −44.210 | 1.20 | 1.81600 | 46.6 |
| 44 | 35.063 | 10.43 | 1.72825 | 28.5 |
| 45 | −32.800 | 0.15 | | |
| 46 | −51.153 | 6.32 | 1.83481 | 42.7 |
| 47 | 137.443 | 0.15 | | |
| 48 | 56.922 | 13.40 | 1.71736 | 29.5 |
| 49 | −157.402 | 5.09 | | |
| 50 | −4938.972 | 4.00 | 1.75500 | 52.3 |
| 51 | 41.983 | 10.15 | 1.51823 | 58.9 |
| 52 | −68.541 | 0.15 | | |
| 53 | −1378.843 | 11.20 | 1.51633 | 64.1 |
| 54 | −25.522 | 1.40 | 1.85025 | 30.1 |
| 55 | −105.630 | 0.15 | | |
| 56 | 657.299 | 8.05 | 1.51633 | 64.1 |
| 57 | −36.928 | 0.99 | | |
| 58 | 50.711 | 8.39 | 1.53996 | 59.5 |
| 59 | −55.709 | 1.42 | 1.84666 | 23.9 |
| 60 | −706.357 | 5.00 | | |
| 61 | ∞ | 33.00 | 1.60859 | 46.4 |
| 62 | ∞ | 13.20 | 1.51633 | 64.2 |
| 63 | ∞ | (Variable) | | |
| Image Plane | ∞ | | | |

Aspheric Surface Data

The 28th Surface

K = 0.00000e+000
A4 = 2.32112e−007

-continued

A6 = 2.35378e−010
A8 = −2.98860e−013
A10 = 1.74212e−016

Various Data
Zoom Ratio: 18.50

|  | Wide Angle End | Intermediate Area | Telephoto End |
|---|---|---|---|
| Focal Distance | 7.20 | 31.29 | 133.17 |
| F-Number | 1.54 | 1.54 | 1.85 |
| Angle of View | 37.38 | 9.97 | 2.36 |
| Image Height | 5.50 | 5.50 | 5.50 |
| Total Length of Lens | 565.91 | 565.91 | 565.91 |
| BF | 47.07 | 47.07 | 47.07 |
| d17 | 5.08 | 79.08 | 112.22 |
| d26 | 150.47 | 62.77 | 4.53 |
| d36 | 2.15 | 15.84 | 40.95 |
| d63 | 12.90 | 12.90 | 12.90 |

Zoom Lens Group Data

| Group | Beginning Surface | Focal Distance |
|---|---|---|
| 1 | 1 | 113.04 |
| 2 | 18 | −29.50 |
| 3 | 27 | 49.00 |
| 4 | 37 | 30.04 |

<Optical System including Reflected Light Path (which follows Separation Element PR)>

Unit: mm
Surface Data

| Surface Number | r | d | nd | vd |
|---|---|---|---|---|
| 41 | ∞ | 43.00 | 1.83481 | 42.7 |
| 42 | ∞ | 1.47 |  |  |
| 43 | 10.076 | 3.70 | 1.63980 | 34.5 |
| 44 | 71.972 | 0.20 |  |  |
| 45 | 9.289 | 3.98 | 1.43875 | 94.7 |
| 46 | −37.000 | 1.50 | 2.00100 | 29.1 |
| 47 | 6.544 | 1.72 |  |  |
| 48 | 10.003 | 5.17 | 1.64000 | 60.1 |
| 49 | −6.240 | 0.70 | 1.95375 | 32.3 |
| 50 | −20.723 | (Variable) |  |  |
| Image Plane | ∞ |  |  |  |

|  | Wide Angle End | Intermediate Area | Telephoto End |
|---|---|---|---|
| Focal Distance | 4.32 | 18.78 | 79.92 |
| F-Number | 3.80 | 3.80 | 3.80 |
| Angle of View | 37.38 | 9.97 | 2.36 |
| Image Height | 3.30 | 3.30 | 3.30 |
| Total Length of Lens | 483.76 | 483.76 | 483.76 |
| BF | 9.00 | 9.00 | 9.00 |
| d17 | 5.08 | 79.08 | 112.22 |
| d26 | 150.47 | 62.77 | 4.53 |
| d36 | 2.15 | 15.84 | 40.95 |
| d50 | 9.00 | 9.00 | 9.00 |

Zoom Lens Group Data

| Group | Beginning Surface | Focal Distance |
|---|---|---|
| 4 | 37 | 27.71 |

TABLE 1

|  | Embodiment 1 | Embodiment 2 | Embodiment 3 | Embodiment 4 | Embodiment 5 |
|---|---|---|---|---|---|
| FwP/Fw | 0.65 | 0.68 | 0.65 | 0.70 | 0.60 |
| vLAG2 − vLAG3 | 49.22 | 65.52 | 49.22 | 35.19 | 65.52 |

TABLE 1-continued

|  | Embodiment 1 | Embodiment 2 | Embodiment 3 | Embodiment 4 | Embodiment 5 |
|---|---|---|---|---|---|
| PRL/L | 0.44 | 0.49 | 0.49 | 0.45 | 0.46 |
| $(fLA \times \varphi LAG1R1)^{-1}$ | 0.57 | 0.53 | 0.63 | 0.59 | 0.60 |

TABLE 1-continued

|  | Embodiment 1 | Embodiment 2 | Embodiment 3 | Embodiment 4 | Embodiment 5 |
|---|---|---|---|---|---|
| Fw | 8.50 | 7.20 | 7.80 | 8.50 | 7.20 |
| FwP | 5.512 | 4.875 | 5.070 | 5.910 | 4.320 |
| vLAG2 | 81.54 | 94.66 | 81.54 | 70.23 | 94.66 |
| vLAG3 | 32.32 | 29.14 | 32.32 | 35.04 | 29.14 |
| PRL | 40.88 | 40.88 | 40.88 | 43.00 | 38.00 |
| L | 93.84 | 83.25 | 82.99 | 95.84 | 83.25 |
| fLA | 36.60 | 29.70 | 34.10 | 37.40 | 26.20 |
| φLAG1R1 | 0.048 | 0.063 | 0.047 | 0.046 | 0.063 |

Although the preferred embodiments according to the present invention has been described as the above, the present invention is not limited to these embodiments, and various modifications and changes are possible within the scope of the present invention.

According to the aspect of the present invention, for example, it is possible to provide a zoom lens advantageous in terms of miniaturization.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-198649, filed Dec. 7, 2021, which is hereby incorporated by reference herein in its entirety.

What is claimed is:

1. A zoom lens comprising in order from an object side to an image side:
   a first lens group of which at least a part is configured to move for focusing;
   a plurality of lens groups which is configured to move in zooming;
   an aperture stop; and
   a final lens group which is configured not to move for zooming,
   wherein the final lens group includes a separation element for separating an incident light thereon into a transmitted light and a reflected light, a relay unit LR having a positive refractive power on which the transmitted light is incident, and a relay unit LA having a positive refractive power on which the reflected light is incident, and
   wherein an inequality $$0.50 < Fwp/Fw < 0.80$$

is satisfied, where Fw is a focal length at a wide angle end of the zoom lens via the relay unit LR and FwP is a focal length at the wide angle end of the zoom lens via the relay unit LA.

2. The zoom lens according to claim 1, wherein the plurality of lens groups includes a lens group having a positive refractive power, arranged next to the aperture stop on the object side, and moving to the object side in zooming from the wide angle end to a telephoto end.

3. The zoom lens according to claim 1, wherein the separation element includes an incident surface and a separation surface for separating a light incident on the incident surface into the reflected light and the transmitted light, and reflects the reflected light from the separation surface with the incident surface to output the reflected light.

4. The zoom lens according to claim 1, wherein, an inequality $$0.35 < PRL/L < 0.60$$

is satisfied, where L is a distance from the aperture stop to an image plane of the zoom lens via the relay unit LA and PRL is an optical path length in the separation element in an optical path of the zoom lens via the relay unit LA.

5. The zoom lens according to claim 1, wherein an inequality $$0.50 < FwP/Fw < 0.75$$

is satisfied.

6. The zoom lens according to claim 1, further comprising a sensor for auto-focusing arranged on an image plane of the zoom lens via the relay unit LA.

7. The zoom lens according to claim 1, wherein the plurality of lens groups includes, in order from the object side to the image side, a lens group having negative refractive power and a lens group having positive refractive power.

8. The zoom lens according to claim 1, wherein the relay unit LA includes a lens LAG1 having a positive refractive power and arranged closest to the object side, and a lens LAGN, and an inequality $$0.20 < (fLA \times \varphi LAG1R1)^{-1} < 1.00$$

is satisfied, where fLA is a focal length of the relay unit LA and φLAG1R1 is a refractive power of a surface of the lens LAG1 on the object side.

9. The zoom lens according to claim 1, wherein the final lens group comprises a sub-lens group configured to adjust a range of the focal length of the zoom lens.

10. The zoom lens according to claim 1, wherein the separation element is a prism.

11. An image pickup apparatus comprising:
    the zoom lens according to claim 1; and
    an image pickup element configured to pick up an image formed by the zoom lens.

12. The zoom lens according to claim 1, wherein the relay unit LA includes, in order from the object side to the image side, a lens having a positive refractive power and a cemented lens in which a positive lens and a negative lens are cemented to each other.

13. The zoom lens according to claim 12, wherein an inequality $$30 < vLAG2 - vLAG3 < 80$$

is satisfied, where vLAG2 is an Abbe number of a material of the positive lens included in the cemented lens and vLAG3 is an Abbe number of a material of the negative lens included in the cemented lens.

14. The zoom lens according to claim 1, wherein the first lens group comprises a second sub-lens group which is configured to move for focusing and a first sub-lens group and a third sub-lens group which are configured not to move for focusing.

15. The zoom lens according to claim 14, further comprising a first and a second driving mechanisms respectively configured to drive the second sub-lens group and the plurality of lens groups in an optical path of the zoom lens.

* * * * *